United States Patent
Brewer et al.

(10) Patent No.: US 8,755,831 B2
(45) Date of Patent: Jun. 17, 2014

(54) SELECTIVELY ALLOCATING DATA CHANNEL RESOURCES TO WIRELESS COMMUNICATION DEVICES WITHIN A WIRELESS COMMUNICATIONS SYSTEM

(75) Inventors: Beth A. Brewer, Canyonlake, TX (US); Harleen K. Gill, San Diego, CA (US)

(73) Assignee: QYALCOMM Incorporated, San Diego, CA (US)

( * ) Notice: Subject to any disclaimer, the term of this patent is extended or adjusted under 35 U.S.C. 154(b) by 408 days.

(21) Appl. No.: 12/728,489

(22) Filed: Mar. 22, 2010

(65) Prior Publication Data
US 2010/0248771 A1 Sep. 30, 2010

Related U.S. Application Data

(63) Continuation-in-part of application No. 12/502,036, filed on Jul. 13, 2009.

(60) Provisional application No. 61/162,976, filed on Mar. 24, 2009, provisional application No. 61/167,077, filed on Apr. 6, 2009.

(51) Int. Cl.
*H04B 7/00* (2006.01)

(52) U.S. Cl.
USPC ........ 455/518; 455/450; 455/451; 455/452.1; 455/509; 455/519

(58) Field of Classification Search
USPC ........... 455/422.1, 450–453, 456.2, 464, 509, 455/510, 517–520, 553.1, 90.2, 78, 79, 500, 455/426.1, 412.1, 414.1, 416, 420; 370/395.41, 332, 352, 389, 338, 328; 375/E7.141
See application file for complete search history.

(56) References Cited

U.S. PATENT DOCUMENTS

| 4,771,422 A | 9/1988 | Hauer |
| 4,771,442 A | 9/1988 | Waddington |

(Continued)

FOREIGN PATENT DOCUMENTS

| CN | 1832414 A | 9/2006 |
| CN | 101009579 A | 8/2007 |

(Continued)

OTHER PUBLICATIONS

International Search Report and Written Opinion—PCT/US2011/029383—ISA/EPO—Jun. 7, 2011.

(Continued)

*Primary Examiner* — Dominic E Rego
(74) *Attorney, Agent, or Firm* — Michael F. Taveira

(57) ABSTRACT

In an embodiment, an access network (AN) receives a request to allocate a given data channel (e.g., a traffic channel (TCH), Quality-of-Service, an Internet Protocol (IP) address, etc.) to a given wireless communication device (e.g., a call originator, a call target, etc.). The AN determines whether the given data channel is available for allocation to the wireless communication device. If the AN determines the given data channel not to be available for allocation to the wireless communication device, the AN determines a priority score to be associated with the received request. The AN initiates one of a plurality of data channel acquisition procedures (e.g., a preemption procedure, a queuing procedure, etc.) if the determined priority score is above at least one priority score threshold, each of the plurality of data channel acquisition procedures configured to obtain the given data channel in order to service the received request.

38 Claims, 11 Drawing Sheets

(56) References Cited

U.S. PATENT DOCUMENTS

| | | | |
|---|---|---|---|
| 5,521,925 A * | 5/1996 | Merakos et al. | 370/337 |
| 6,067,457 A | 5/2000 | Erickson et al. | |
| 6,167,252 A | 12/2000 | Cohen | |
| 6,243,580 B1 | 6/2001 | Garner | |
| 6,275,575 B1 | 8/2001 | Wu | |
| 6,636,482 B2 * | 10/2003 | Cloonan et al. | 370/230 |
| 6,674,713 B1 | 1/2004 | Berg et al. | |
| 6,721,831 B1 * | 4/2004 | Lee | 710/105 |
| 6,725,052 B1 | 4/2004 | Raith | |
| 6,744,732 B1 * | 6/2004 | Pfenning et al. | 370/235 |
| 6,781,963 B2 | 8/2004 | Crockett et al. | |
| 6,970,926 B1 | 11/2005 | Needham et al. | |
| 7,089,016 B2 * | 8/2006 | Dokko | 455/452.1 |
| 7,093,044 B2 * | 8/2006 | Joy et al. | 710/110 |
| 7,397,774 B1 * | 7/2008 | Holland et al. | 370/326 |
| 7,545,780 B2 | 6/2009 | Chitrapu | |
| 7,616,572 B2 | 11/2009 | Elmasry et al. | |
| 7,689,232 B1 | 3/2010 | Beyer, Jr. | |
| 7,761,110 B2 | 7/2010 | Chotai et al. | |
| 7,761,515 B2 | 7/2010 | Denninghoff | |
| 7,848,642 B1 | 12/2010 | Chaudhuri et al. | |
| 8,094,618 B2 * | 1/2012 | Yi et al. | 370/329 |
| 8,223,935 B2 | 7/2012 | Krishnamoorthy et al. | |
| 8,422,651 B2 | 4/2013 | Krishnamoorthy et al. | |
| 8,577,404 B2 | 11/2013 | Brewer et al. | |
| 2003/0157935 A1 | 8/2003 | Kauhanen | |
| 2004/0005904 A1 | 1/2004 | Wolf et al. | |
| 2004/0058695 A1 * | 3/2004 | Ji et al. | 455/500 |
| 2004/0077358 A1 | 4/2004 | Bennett et al. | |
| 2004/0125800 A1 | 7/2004 | Zellner | |
| 2004/0142694 A1 | 7/2004 | Levy et al. | |
| 2004/0202178 A1 | 10/2004 | Okubo | |
| 2005/0053206 A1 | 3/2005 | Chingon et al. | |
| 2005/0124365 A1 | 6/2005 | Balasuriya et al. | |
| 2006/0120321 A1 * | 6/2006 | Gerkis et al. | 370/329 |
| 2006/0142006 A1 | 6/2006 | Ryoo | |
| 2006/0276213 A1 | 12/2006 | Gottschalk et al. | |
| 2007/0004438 A1 | 1/2007 | Brusilovsky et al. | |
| 2007/0049335 A1 | 3/2007 | Haitani et al. | |
| 2007/0195762 A1 * | 8/2007 | Choi et al. | 370/389 |
| 2007/0197248 A1 | 8/2007 | Reich et al. | |
| 2007/0197249 A1 | 8/2007 | Ross et al. | |
| 2007/0202910 A1 | 8/2007 | Brewer et al. | |
| 2007/0218903 A1 | 9/2007 | Grech | |
| 2007/0239824 A1 | 10/2007 | Shaffer et al. | |
| 2007/0249381 A1 | 10/2007 | Forslow | |
| 2008/0003942 A1 | 1/2008 | Namm et al. | |
| 2008/0076391 A1 | 3/2008 | Chen et al. | |
| 2008/0081567 A1 | 4/2008 | Rofougaran | |
| 2008/0146203 A1 | 6/2008 | Khawand et al. | |
| 2008/0175189 A1 | 7/2008 | Furrer et al. | |
| 2008/0207242 A1 | 8/2008 | Ekberg | |
| 2008/0281971 A1 | 11/2008 | Leppanen et al. | |
| 2008/0298308 A1 | 12/2008 | Hannu et al. | |
| 2009/0061904 A1 | 3/2009 | Emrich et al. | |
| 2009/0080360 A1 | 3/2009 | Song | |
| 2009/0209196 A1 | 8/2009 | Haverty | |
| 2009/0275281 A1 | 11/2009 | Rosen | |
| 2009/0312045 A1 | 12/2009 | Miller et al. | |
| 2010/0016008 A1 | 1/2010 | Brewer et al. | |
| 2010/0020958 A1 | 1/2010 | Roberts et al. | |
| 2010/0074222 A1 * | 3/2010 | Wu | 370/331 |
| 2010/0248742 A1 | 9/2010 | Song et al. | |
| 2010/0255826 A1 | 10/2010 | Brewer et al. | |
| 2011/0026419 A1 * | 2/2011 | Kim et al. | 370/252 |
| 2012/0295617 A1 | 11/2012 | Anchan et al. | |
| 2013/0190033 A1 | 7/2013 | Aggarwal et al. | |

FOREIGN PATENT DOCUMENTS

| | | |
|---|---|---|
| CN | 101189810 A | 5/2008 |
| EP | 1193993 | 4/2002 |
| EP | 1681896 | 7/2006 |
| EP | 1871139 | 7/2008 |
| JP | 3050996 A | 3/1991 |
| JP | 6334587 A | 12/1994 |
| JP | 8508373 | 9/1996 |
| JP | 11504782 T | 4/1999 |
| JP | 2000350256 A | 12/2000 |
| JP | 2001103551 A | 4/2001 |
| JP | 2003086233 A | 3/2003 |
| JP | 2003209885 A | 7/2003 |
| JP | 2003298751 A | 10/2003 |
| JP | 2006515135 A | 5/2006 |
| JP | 2007505563 A | 3/2007 |
| JP | 2009302605 A | 12/2009 |
| WO | 9732443 A2 | 9/1997 |
| WO | 0145330 A1 | 6/2001 |
| WO | 0230010 A1 | 4/2002 |
| WO | 03036801 A2 | 5/2003 |
| WO | 2004075001 A2 | 9/2004 |
| WO | 2005027483 A1 | 3/2005 |
| WO | 2005096658 A1 | 10/2005 |
| WO | 2005112488 | 11/2005 |
| WO | 2006129985 | 12/2006 |
| WO | 2007098331 | 8/2007 |
| WO | WO2008048273 A2 | 4/2008 |
| WO | 2008091893 | 7/2008 |

OTHER PUBLICATIONS

International Search Report, PCT/US2010/028538, International Searching Authority, European Patent Office, Jun. 24, 2010.

Written Opinion, PCT/US2010/028538, International Searching Authority, European Patent Office, Jun. 24, 2010.

Open Mobile Alliance (OMA) Ltd: "Push to Talk Over Cellular (PoC)-Architecture Draft Version 2.0", Open Mobile Alliance OMA-AD_PoC-V2_0-20060224-D, Feb. 24, 2006, pp. 1-218, XP-002462873.

* cited by examiner

SELECTIVELY ALLOCATING DATA CHANNEL RESOURCES TO WIRELESS COMMUNICATION DEVICES WITHIN A WIRELESS COMMUNICATIONS SYSTEM

CLAIM OF PRIORITY UNDER 35 U.S.C. §119

The present Application for Patent claims priority to Provisional Application No. 61/162,976 entitled "SYSTEM AND METHOD FOR ALLOCATING TRAFFIC CHANNEL RESOURCES FOR COMMUNICATIONS FROM MOBILE DEVICES" filed on Mar. 24, 2009, and Provisional Application No. 61/167,077 entitled "EMERGENCY COMMUNICATION SESSIONS WITHIN A WIRELESS COMMUNICATIONS SYSTEM" filed on Apr. 6, 2009, and each of which is incorporated herein by reference in its entirety.

CLAIM OF PRIORITY UNDER 35 U.S.C. §120

The present application is a continuation-in-part of co-pending U.S. Non-Provisional application Ser. No. 12/502,036, entitled "PRIORITIZATION OF GROUP COMMUNICATIONS AT A WIRELESS COMMUNICATION DEVICE" filed on Jul. 13, 2009, which is incorporated herein by reference in its entirety.

BACKGROUND

1. Field of the Invention

Embodiments are directed a selective allocation of data channels to wireless communication devices by an access network within a wireless communications system.

2. Description of the Related Art

There exists a wireless telecommunication data network service that allows for the wireless transmission of data via radio signals. The data network can provide broadband access to applications by establishing point to point data links between IP nodes. Instead of using the standard cellular infrastructure to service data requests the requests are serviced by forming separate point to point connections between each IP node at one or more servers and the target(s). One example of such a data connection is voice over internet protocol (VoIP) or a push-to-talk ("PTT"). A VoIP communication generally allows telephone calls to be made over computer networks like the Internet. The protocol for VoIP is operable to digitize voice signals and supports real-time, two-way transmission of conversations using Internet Protocol. A PTT communication connection is typically initiated by a single button-push on the wireless device that activates a half-duplex link between the speaker and at least one target and once the button is released, the device can receive incoming PTT transmissions. Existing PTT systems have advantages over traditional cellular systems because they have faster call setup times, e.g., setup times ideally in the range of 1 second as opposed to cellular voice channels that can take more than 5 seconds to establish. In some arrangements, the PTT speaker will have the "floor" whereby non-floorholders are not permitted to speak. Once the speaker or floorholder releases the PTT button, another PTT participant can engage their PTT button to become the next floorholder. The call originator's voice can be sent through the carrier's network to the target handset so long as the call originator remains the floorholder.

SUMMARY

In an embodiment, an access network (AN) receives a request to allocate a given data channel (e.g., a traffic channel (TCH), Quality-of-Service, an Internet Protocol (IP) address, etc.) to a given wireless communication device (e.g., a call originator, a call target, etc.). The AN determines whether the given data channel is available for allocation to the wireless communication device. If the AN determines the given data channel not to be available for allocation to the wireless communication device, the AN determines a priority score to be associated with the received request. The AN initiates one of a plurality of data channel acquisition procedures (e.g., a preemption procedure, a queuing procedure, etc.) if the determined priority score is above at least one priority score threshold, each of the plurality of data channel acquisition procedures configured to obtain the given data channel in order to service the received request.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

In this disclosure, the terms 'communication device,' 'wireless device,' 'wireless communications device,' 'PTT communication device,' 'handheld device,' 'mobile device,' and 'handset' are used interchangeably. The terms 'call' and 'communication' are also used interchangeably. The term 'exemplary' means that the disclosed element or embodiment is only an example, and does not indicate any preference of user. The term 'group communication' or 'PTT' communication can be a point-to-point or point-to-multipoint communication or voice and/or data. Further, like numerals refer to like elements throughout the several drawings, and the articles "a" and "the" include plural references, unless otherwise specified in the description.

The term 'circuitry' used through the disclosure can include specialized computer circuits that embody logic operable to perform function(s). In other instances the term 'circuitry' can include circuits configured by firmware that embodies logic operable to perform function(s). In other instances, the term 'circuitry' can include a general purpose processing unit that can be configured by software instructions that embody logic operable to perform function(s). In the latter example, an implementer may write source code embodying logic that can be compiled into machine readable code. The compiled code can then be processed by the general purpose processing unit thereby transforming the general purpose processing unit into a special purpose processor. One skilled in the art can appreciate that the state of the art has evolved to a point where there is little difference between hardware, firmware, software, and a combination of hardware/firmware/software, and the selection of hardware versus software is a design choice left to an implementer. More specifically, one of skill in the art can appreciate that a software process can be transformed into an equivalent hardware circuit, and a hardware circuit can itself be transformed into an equivalent software process.

Figure 1:
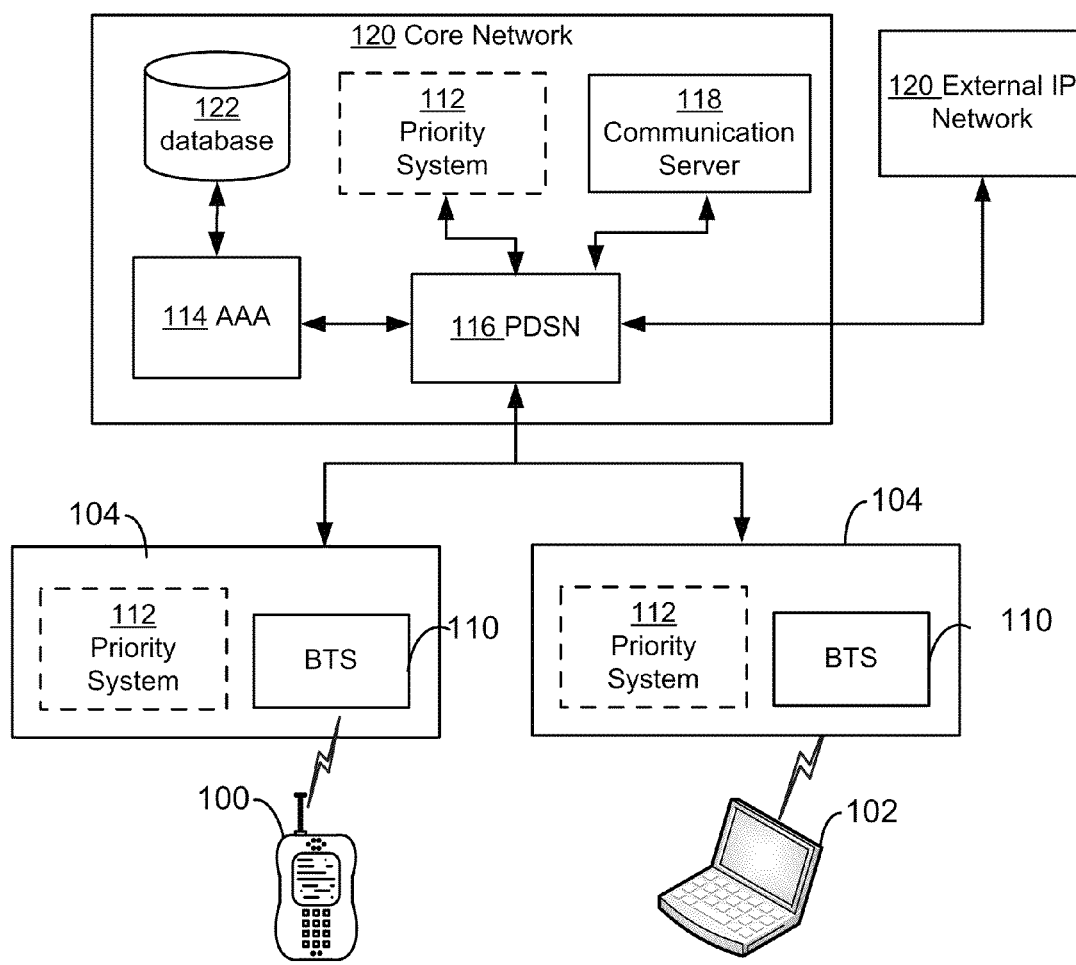
FIG. 1 illustrates an environment for practicing embodiments of the invention.

FIG. 1 illustrates an exemplary operational environment for practicing embodiments of the invention. The wireless network can be maintained by a network provider such as a company and in this example, the wireless network can be configured to provide data services to VoIP clients, PTT clients, and/or IP based applications. FIG. 1 depicts two wireless devices 100 and 102, however, one skilled in the art can appreciate that more than two can be serviced. A mobile device in an exemplary embodiment of the present invention can include a cellular phone, PDA, laptop computer, desktop computer or any other computer system that includes broadband wireless functionality. As is illustrated by FIG. 1, mobile device 100 and 102 can be in wireless communication with a base station controller 104 that can include components such as a base transceiver station (BTS) 110 and/or a priority access system 112. In exemplary embodiments, elements 110 and 112 can be effectuated by circuitry of one or more computer systems. For example, the priority access system 112 can include circuitry, e.g., hardware or a combination of hardware, software and/or firmware, for prioritizing data channel access requests. Continuing with the description of FIG. 1, the BTS 110 can act as an access point to the wireless network and can wirelessly communicate with mobile device 100 using a wireless protocol such as GSM, CDMA, UMTS, TDMA, FDMA, or the like. The BTS 110 can be configured to broadcast messages to mobile device 100 over a broadcast control channel. The messages can include information that indicates to mobile device 100 how to connect to an access channel (i.e., a shared reverse-link channel). As illustrated by FIG. 1, in an exemplary embodiment the base station controller 104 can include a priority access system 112, however as indicated by the dashed lines in other example embodiments, priority access system 112 can be located at each base station controller in the mobile network and/or within the core network 120.

Continuing with the description of FIG. 1, each base station controller can be operatively coupled to a packet data serving node (PDSN) 116 via a local area network (LAN). The PDSN 116 can act as a connection point between a radio access network (RAN), as the RAN typically including the base stations 104, and an IP network. For example, the PDSN 116 can be configured to manage point to point protocol sessions (e.g., direct connection sessions, between the Internet and mobile devices 100 and/or 102). When a mobile device accesses the wireless data network to obtain services, the PSDN 116 can interface with an authentication, authorization, and accounting server (AAA) 114 to authenticate the mobile devices 100 and/or 102. The AAA 114 can be coupled to a database 122 operable to store information such as user accounts and privileges, or a user priority level for a mobile device or potential service-type priorities for the account. In exemplary embodiments, the AAA 114 can access information in the database to determine the identity of a mobile device requesting service; determine a service level for the mobile device based upon the user request for the call, e.g., quality of service; and/or track the consumption of network resources. In addition to connecting to the AAA, the PDSN 116 can be configured to connect to an external IP network 120 such as the Internet in order to access the web and/or IP based service such as location finding programs that rely on GPS coordinates of the mobile devices, websites, email applications, instant messaging over mobile devices, and/or E-911.

Continuing with the description of FIG. 1, the PDSN 116 can additionally be coupled to one or more communication servers 118. For example, in a PTT communication scenario the communication server 118 can be configured to control data communications between a group of mobile devices, e.g., devices 100 and 102. In an exemplary embodiment involving PTT communication techniques, the communications server 118 can be configured to send a flag to members of the communications group indicating that the mobile device 100 is present, i.e. accessible, on the wireless network. The communication server 118 can share this information with the group of target mobile devices, or can also share is with other mobile devices accessible across the wireless network. The communication server 118 can have an attached or accessible database to store the group identification data for the wireless devices. It should be noted that the AAA 114 can alternatively be interfaced with other components of the cellular network, or can be a stand-alone component on the system with data access to other components.

Figure 2A:
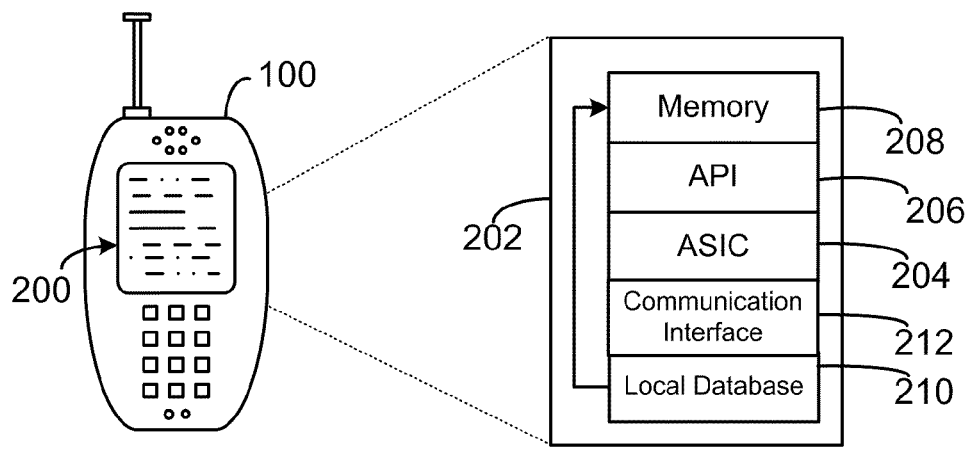
FIG. 2A illustrates a mobile device in accordance with an embodiment of the invention.
Figure 2B:
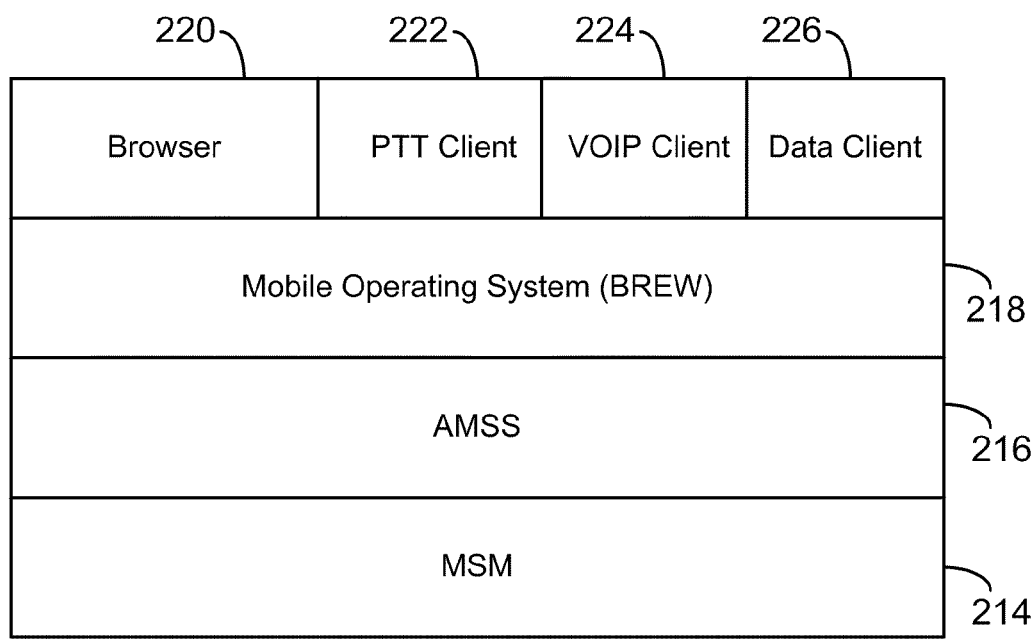
FIG. 2B illustrates software layering on a computer platform of the mobile device of FIG. 2A in accordance with an embodiment of the invention.

Referring now to FIG. 2, it illustrates an exemplary mobile device 100. Generally, devices such as mobile device 100 can download many types of applications, such as web pages, applets, MIDlets, games and data. In wireless devices that communicate over PTT or VoIP, the wireless communication device can directly connect with the other member and engage in voice and data communication. The mobile device 100 is also shown having a graphics display 200 and can include a computer platform 202 that can handle voice and data packets, and receive and execute software applications transmitted across the wireless network. The computer platform 202 can include, among other components, an application-specific integrated circuit ("ASIC") 204, or other processor such as a general purpose processor, microprocessor, logic circuit, programmable gate array, or other data processing device. The ASIC 204 is installed at the time of manufacture of the mobile device 100 and is not normally upgradeable. The ASIC 204 or other processor executes an application programming interface ("API") layer 206, which includes the resident application environment, and can include the operating system loaded on the ASIC 204. The resident application environment interfaces with any resident programs in the memory 208 of the mobile device 100. An example of a resident application environment is the "binary runtime environment for wireless" (BREW) software developed by QUALCOMM® for wireless device platforms.

As shown here, the mobile device 100 can be a mobile telephone, with a graphics display 200, but can also be any wireless device with a computer platform 202 as known in the art, such as a personal digital assistant (PDA), a pager with a graphics display 200, or a computer system such as a laptop that has a wireless communication portal, and may otherwise have a wired connection to a network or the Internet. Further, the memory 208 can be comprised of read-only or random-access memory (RAM and ROM), EPROM, EEPROM, flash cards, or any memory common to computer platforms. The computer platform 202 can also include a local database 210 for storage of software applications not actively used in memory 208. The local database 210 is typically comprised of one or more flash memory cells, but can be any secondary or tertiary storage device as known in the art, such as magnetic media, EPROM, EEPROM, optical media, tape, or soft or hard disk.

In this embodiment, the computer platform 202 can also include a communication interface 212 that can open a direct communication channel, such as a PTT communication. The communication interface 212 can also be part of the standard communication interface for the mobile device 100 which ordinarily carries the voice and data transmitted to and from the wireless device. The communication interface 212 typically is comprised of hardware as is known in the art.

Continuing with the description of FIG. 2, additionally depicted is a diagram of one embodiment of the software layers of the group application client that can include, but is not limited to, PTT functionality and VoIP functionality. In this embodiment, the computer platform 202 in the mobile device environment can include a series of software "layers" developed on top of the Mobile Station Modem (MSM) 214 and the Advanced Mobile Subscriber Software (AMSS) 216, developed by QUALCOMM®. In this example, the underlying MSM chipset can implement the software protocol stack for the entire suite of CDMA communication technologies that include CDMA2000 1X and CDMA2000 1xEV-DO. In this example, the AMSS can be configured to support a mobile operating system layer 218, which in this embodiment is BREW®, also developed by QUALCOMM®. The mobile operating system layer 218 can provide an application programming interface for chip or device-specific operations, while providing an isolation layer that eliminates direct contact to the AMSS 216 and any OEM software on the computer platform. The mobile operating system layer 218 can enable application development that uses mobile device features without having to rewrite the application each time a new release of the device-specific software is released.

In this example, the mobile operating system 218 can include one or more IP applications such as a web browser 220, PTT client 222, VoIP client 224, and/or any other IP based mobile application. The browser 220 can include a software application that is operable to allow a user of the mobile device 100 to interact with information rendered in a webpage. The PTT client 222 and the VoIP client 224 can maintain access to PTT/VoIP services, respond to communication requests, process outgoing PTT/VoIP requests, etc.

Figure 3:
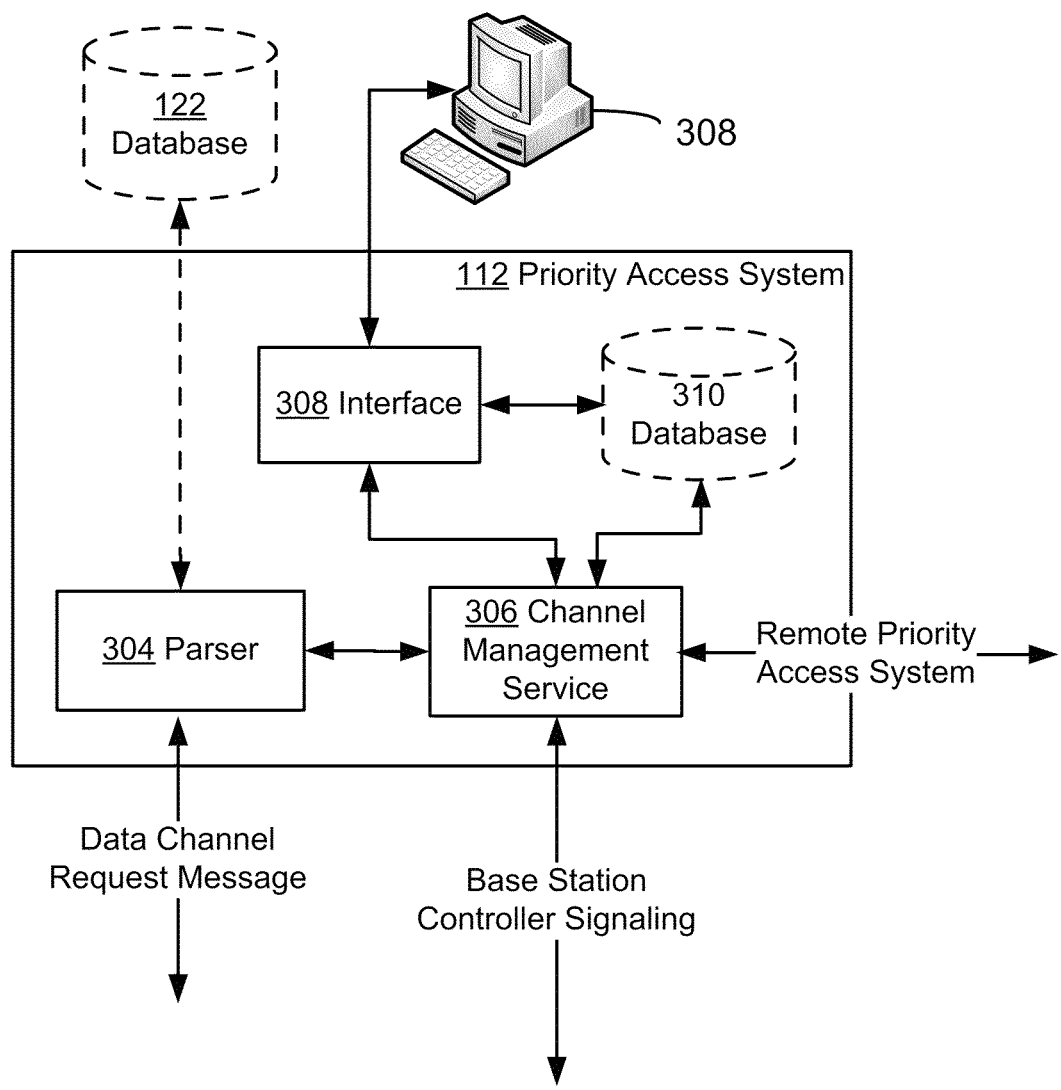
FIG. 3 illustrates a priority access system in accordance with an embodiment of the invention.

Referring now to FIG. 3, an exemplary priority access system 112 is shown, labeled as priority access system 300, which can be used to prioritize the allocation of data channels. For example, the priority access system 300 can be configured to manage how the data channels are allocated. In an exemplary embodiment, the number of available data channels is typically finite and the data channels may be managed when the base station transceiver 104 is under heavy use, e.g., all the channels are servicing mobile devices, especially for PTT communications. As used herein, "data channel" is intended to encompass all the "over-the-air" (OTA) elements that are required to establish a data communication session, such as the requisite traffic channels (e.g., Walsh codes, etc.), maintenance of QoS, IP addresses, PPP sessions, and the like. Any OTA element can be "prioritized" depending on where resources are limited. Thus, a request for a data channel can include both a request for physical-layer resources as well IP-layer resources. As is illustrated by FIG. 3, in an embodiment, the priority access system 300 can include a parser 304, channel management service 306, an interface 308, and/or a database 310. The components 304-310 can be effectuated by circuitry of one or more computer systems, e.g., the system 300 can be distributed across different processes and/or different physical processors. As is illustrated by FIG. 3, the priority access system 112 can be operable to receive data channel access request messages from an outside source such as a data channel allocation process of the base station controller 104, the base transceiver station 110, and/or the PDSN 116 depending on the implementation. The priority access system 112 can be configured to process incoming data channel access request messages and send prioritization messages to the base station controller 104. As shown by FIG. 3, in at least one embodiment, the priority access system 112 can interface with remote priority access systems, e.g., in an embodiment where the priority access system 112 interfaces with a foreign mobile network and/or when a data channel access request is routed to a remote base station controller that can include a remote priority access system 112.

Below, a series of flowcharts depicting operational procedures in accordance with embodiments of the invention are described. The flowcharts are organized such that the initial flowcharts present implementations via an overall viewpoint. Those having skill in the art can appreciate that the style of presentation utilized herein, e.g., beginning with a presentation of a flowchart(s) presenting an overall view and thereafter providing additions to and/or further details in subsequent flowcharts, generally allows for a rapid and easy understanding of the various operational procedures.

Figure 4:
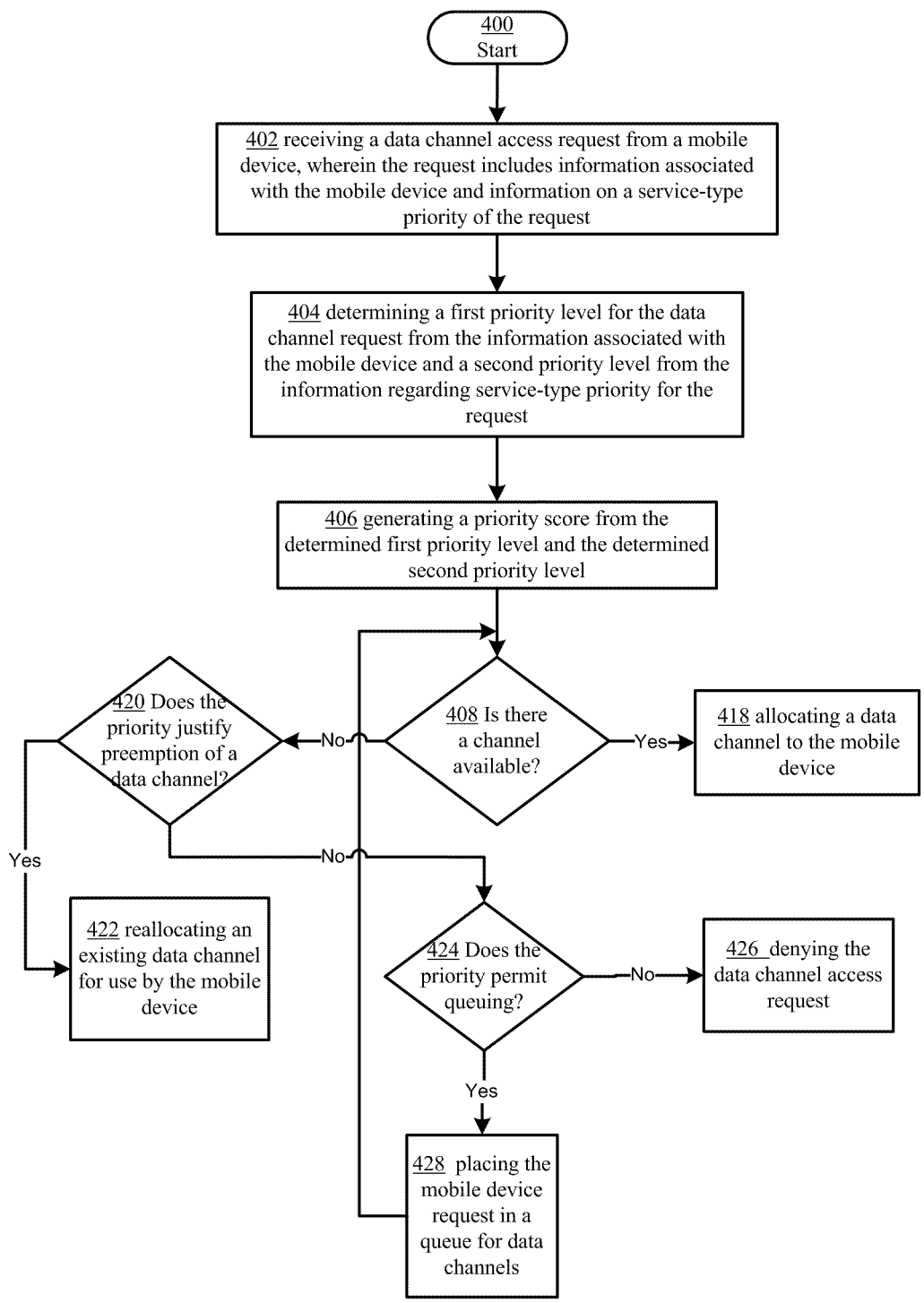
FIG. 4 illustrates an operational procedure related to prioritizing access to data channel resources in accordance with an embodiment of the invention.

Referring now to FIG. 4, there is illustrated an operational procedure related to prioritizing access to data channel resources. The process of FIG. 4 is performed by the priority access system 112, which can be positioned within the BSC 104 or the core network 120. In this embodiment, the originator device's priority is assigned by the network operator and at least a range of service-type priorities are made available to the user by the network operator such that the user can request a priority of service which the originator is trying to initiate. Operation 400 begins the operational procedure and operation 402 illustrates the receipt of a data channel access request at the priority access system 112 from a mobile device, wherein the request includes information associated with the mobile device's assigned priority, such as for example, a commander device in a firemen's unit, and information on a service-type priority of the request made by the user, such as a high-priority or an emergency call. The service-type priority corresponds to a requested priority level for the session to be initiated, whereas the mobile device's assigned priority corresponds to a priority level that is allocated to the mobile device by default (e.g., a high-priority user's normal-call can be allocated a higher priority level than a low-priority user's normal call), in an example.

For example, and referring to FIG. 1, the receipt of the data channel access request in 402 of FIG. 4 can correspond to the mobile device 100 transmitting a data channel access request to the base transceiver station 110, with the BTS 110 then forwarding the data channel access request to the priority access system 112 either within the BSC 104 or at the core network 120. The request in this example can include information associated with the mobile device 100 For example, the request can include a mobile station identifier such as a 10 digit number identifying the subscriber, the international mobile station identity, or any other information that could uniquely identify the mobile device 100 and/or the user of the mobile device 100. The request in this example can additionally include information that identifies one or more target endpoint(s) for the request. For example, an endpoint in an embodiment can include an IP based target of the communication request. This can be in the form of a mobile number associated with a target device, such as mobile device 102. In another embodiment, the endpoint can be identified by a Session Initiation Protocol (SIP) (or like) addressing scheme or other unique identifier that the network operator may assign to a subscriber. In other exemplary embodiments the information can include a website, a FTP site, and/or an IP address associated with a service such as email, instant messaging, or another service.

In an embodiment, the receiving of operation 402 of FIG. 4 can correspond to the priority access system 112 receiving the request within the BSC 104 and/or receiving a forwarded version of the request at the core network 120. In an example, if the request for the data channel includes both a request for TCH or physical-layer resources as well as IP-layer resources (e.g., QoS, etc.), the request may require routing to the priority access system 112 at the BSC 104 as well as the core network 120 (e.g., because the BSC 104 typically handles TCH-allocations whereas IP-layer resources can at least partially involve elements at the core network)

In an embodiment, receiving the request in 402 of FIG. 4 at the priority access system 112 does not necessarily require the priority access system 112 to process the request. For example, the request can be received in embodiments where every request is processed, or in other embodiments a select number of requests (e.g., less than all requests) can be processed. For example, requests can be processed when the base station controller 104 does not have available data channels or a threshold level of in-use data channels has been reached. For example, the priority access system 112 can be operable to triage data channel access requests when the base station controller 104 is under heavy use, e.g., all or a substantial number of the data channels are in-use. In this example, the priority access system 112 can be configured to monitor the number of in-use data channels and activate when the maximum number of channels are in-use or when a substantial number, e.g., 70-80%, of the channels are in-use. In this example, the number of requests that are processed will scale with the level of data channel resources available.

Continuing with the description of FIG. 4, at operation 404, the priority access system 112 determines a first priority level for the data channel access request based on the information associated with the mobile device (e.g., the mobile device's identification) and a second priority level based upon the service-type priority requested by the user of the mobile device (e.g., the call is high-priority, normal-priority, an emergency-call, etc.). For example, and referring to FIG. 3, in the instance that data channel triage techniques are activated (e.g., one or more of the requested resources are limited), the data channel access request can be received by the base transceiver station 110 and routed to the parser 304 of the priority access system 112. In this example, the priority access system 112 can be configured to determine a priority score for the data channel access request by determining the priority levels associated with both (i) the mobile device 100 originating the request and (ii) a service-type-priority requested by the mobile device 100 and indicated in the data channel access request.

In an embodiment, the information associated with the mobile device 100 can either be an identification of the mobile device 100 (or a user of the mobile device 100) from which the priority access system 112 will look-up the priority level of the mobile device 100, or alternatively can be an explicit indication of the mobile device's 100 priority level. For example, in the case where the information associated with the mobile device 100 corresponds to an explicit indication of the mobile device's 100 priority level, the mobile device 100 can be provisioned with its own priority level, and when the mobile device 100 attempts to access the data network the mobile device 100 can send its priority level. For example, the priority level can be encrypted with a public key and stored in the local database 210 of mobile device 100. When the mobile device attempts to access the data channel, the mobile device 100 can transmit the digitally encrypted priority level to the base transceiver station 110. The parser 304 can be configured to receive the encrypted priority level and decrypt it with a corresponding private key. In another embodiment, in the case where the information associated with the mobile device 100 corresponds to an identification of the mobile device 100 (or a user of the mobile device 100), the priority access system 112 can determine the mobile device's priority level by using the identifying information of the mobile device 100 and/or user (such as IMSI) and then looking up the priority level either at the AAA 114 or in another database (e.g., within a priority look-up table contained therein).

In an embodiment, the priority score associated with requests to initiate PTT or VoIP calls can be based upon the originator's priority level and/or type of service priority. However, for a request from an originating mobile device that identifies at least one target device, or where the group communication server 118 can determine the target(s) for the originating device's call, the priority score could also be based at least in part upon the intended target device. Thus, when determining the priority score for the data channel access request, the priority access system 112 can take into account (i) the originating mobile device's 100 priority level, (ii) the requested or service-type priority level for the session to be initiated, and/or (iii) a priority level associated with the one or more target devices for the call, if the target device identification(s) are available. For example, it is conventional for the target device identification(s) to be included in a call set-up message and not a data channel access request message. In this embodiment, however, the data channel access request message itself can be configured to include the target-device identification(s).

In another embodiment, the parser 304 can be configured to receive the data channel access request message and search for one or more bits of information that identifies the requesting mobile device 100. The parser 304 in this example can then send a query to database 122 requesting the priority levels associated with the requesting mobile device 100. The database 122 in this exemplary embodiment can store information such as identifiers for each mobile device. In alternative embodiments the database 122 can merely store information that identifies whether particular mobile devices are prioritized and what service-type priorities are available. In this example, if the database does not include an entry for a particular mobile device or have service-type priorities, the database 122 can be configured to send a message back to the parser 304 indicating that the requesting mobile device 100 has a default priority level (e.g., the lowest possible priority).

In an example, the device or user-specific priority levels and the service-type priority levels available for request by the user can be set by a network provider based on predetermined criteria. For example, a network provider can generate a number of device or user-specific priority levels such as 1-15 and assign each mobile device/endpoint a number based on, for example, whether a subscriber pays an additional fee for priority access to the data network. In another example, each mobile device/endpoint can be assigned a range of numbers that are available for selection for the mobile device's or endpoint's service-type priority level. In this case, by default, calls initiated by the mobile device or endpoint will be granted a priority level of the mobile device's device-specific or user-specific priority level. However, the user of the mobile device will be able to configure a higher priority level for high-priority or emergency calls. The service-type priority range need not be the same for all users or mobile devices. For example, an emergency responder may be able to set his/her emergency calls to a service-type priority level that is higher than an emergency-call service-type priority level of a more typical emergency call. For example, in an embodiment the network provider may assign each emergency service user such as a police officer, EMT, or first responder a higher device or user-specific priority level than a general user, e.g., non-emergency provider affiliated user. The network provider can additionally distinguish between different types of emergency providers within a group by assigning different priority levels or numbers to different members, e.g., a group can be formed of police officers and a police captain can have a higher device or user-specific priority level than a police officer. Similarly, user designations can be associated with different priority levels based on a perceived need of the user (i.e., the service-type priority level).

As an example, different rules can be applied in different scenarios in terms of establishing a priority score for a particular request. For example, if a network operator is aware that a disaster is taking place and expects a number of emergency calls, than mobile devices with a high user-specific or device-specific priority may always obtain preemption permission whereas mobile devices with a lower priority may be rejected outright unless the low-priority mobile devices indicate that their call is an emergency. By contrast, in a non-disaster scenario, the calls from the lower-priority mobile devices may be serviced and only rejected if no resources are available. For example, in the non-disaster scenario, mobile devices with a high device-specific or user-specific priority level that indicate a high service-type priority level may obtain a highest priority score, mobile devices with a high device-specific or user-specific priority level that indicate a low service-type priority level may obtain a second highest priority score, mobile devices with a low device-specific or user-specific priority level that indicate a high service-type priority level may obtain a third highest priority score and mobile devices with a low device-specific or user-specific priority level that indicate a low service-type priority level may obtain a fourth highest priority score. Of course, in other embodiments, different rules for ranking and/or generating priority scores can be implemented.

Continuing with the description of FIG. 4, in operation 406, the priority access system 112 generates a priority score for the data channel access request based on the determined first priority level (i.e., the device or user-specific priority) and the determined second priority level (i.e., the service-type priority). For example, and in addition to the previous example, once the priority level(s) for the request have been obtained information indicative of the priority level(s) can be routed to a channel management service 306 that is operable to determine the priority score for the request. In an exemplary embodiment, the priority score can be determined in accordance with one or more algorithms that use the priority level(s) as factors in an equation. The algorithm used to generate the priority score can be stored in a database 310 and accessed via a database management program. The algorithm used to determine the priority score can be loaded into active memory of the channel management service 306 at runtime. The database 310 in this example can include various algorithms and an administrator of the network provider can operate a computer 308 and select the algorithm for the prioritization process via an interface 310 such as a web browser, for example, if a plurality of priority score-determining algorithms is available for selection.

For example, the priority score algorithms can include equations and/or rules that rely solely on the user or device-specific priority of the mobile device associated with the request, and/or solely on the service-type priority of the request. In another embodiment, an algorithm can be used that selects the higher of the user/device specific or service-type priority levels associated with the request. Other more sophisticated algorithms can be used in embodiments that rely on a combination of the priority level associated with the requesting mobile device and the priority level of the service-type level where one or both of the priority levels can be weighted or multiplied by a scalar value. Other priority factors can be added to the determination, such as the different endpoints for the call desired, e.g., an E-911 website can have a higher priority level than a sports oriented website and a target mobile device associated with a police officer can have a higher priority than a target mobile device associated with a casual acquaintance. Accordingly, the priority score can be further based on target-information associated with the request, in addition to the user or device-specific and service-type priority levels.

Once the priority score is generated in 406, the channel management service 306 of the priority access system 112 determines whether to allocate a data channel to the request, as shown at decision 408. For example, in an embodiment, the channel management service 306 can determine to allocate a data channel to service the request. The channel management service 306 can include a priority table stored in, for example, active memory that maps priority scores to different actions such as the allocation of data channels. In this exemplary embodiment, the priority table can include one or more priority scores (or score-ranges) and at least one of the priority scores or score-ranges can be mapped to an action that directs the channel management service 306 to allocate a data channel to the mobile device 100. For example, in an embodiment, the priority access system 112 can be configured to activate when a certain number of data channels are in-use. In this example, the channel management service 306 can be configured to allocate one of the existing data channels to service the request if the priority score of the request mapped to a value or value-range indicative of allocation. Conversely, the logic executed at the channel management service 306 could also determine not to grant the data channel access request in 408.

In exemplary embodiments, different priority tables can be used by the channel management service 306 depending on different situations. The priority table can be selected or loaded when the channel management service 306 is initialized, and the priority table can be modified or a new priority table can be dynamically loaded by an administrator via an interface 310, or in response to predetermined triggering criteria (e.g., such as a weakening or loss of signal(s) from neighboring base transceiver stations and/or base station controllers, receiving a high volume of data channel access requests within a predetermined amount of time, or receiving information from the core network 120 that indicates that the network is experiencing difficulty).

Referring again to decision 408, if there is a data channel available for allocation, then the priority access system 112 instructs the BSC 104 to allocate the requested data channel to the requesting mobile device, as shown at operation 418. In one example of 408, a data channel being 'available' can be interpreted literally, such if any data channels are available for allocation to the requesting mobile device 100, the requested data channel is allocated to the mobile device. Alternatively, in another example of 408, the data channel being 'available' can mean available for allocation. In other words, if a threshold number of data channels, or a threshold percentage of data channels, are available for allocation, then the decision of 408 can determine to allocate one of the data channels to the requesting mobile device 100 irrespective of the priority score of the request.

Otherwise, in 408, if the priority access system 112 determines that there is not an immediate channel available for allocation to the request, to the priority access system 112 determines whether the priority score generated in 406 justifies a preemption of a data channel currently being used by another device, as shown at decision 420. If the priority score from 406 is determined to justify the preemption in 420, then the data channel is reallocated from the other device to the requesting mobile device, as shown at operation 422. As will be appreciated, the priority access system 112 can select the device that will be having its data channel preempted by the requesting device based at least in part on the priority score of the selected device, and potentially other factors such as how long the selected device has had access to the data channel, a level of the selected device's usage of the data channel and so on. Otherwise, in this embodiment, if the priority score from 406 is determined not to justify the preemption of a data channel at decision 420, then the priority access system 112 determines whether the priority score of the request (from 406) is sufficient to permit queuing, as shown at decision 424. If queuing is not permitted at decision 424, then the data channel access request is denied, as shown at operation 426. In another embodiment, if priority queuing is not used, decision 424 can be omitted such that if preemption is not justified at decision 420, then the data channel access is denied at operation 426. Otherwise, if queuing is permitted at decision 424, then request is placed in a queue as shown at operation 428 to await the next open data channel and enter a looping wait-state at decision 408. Any priority within the queue can be used based upon a pre-set scheme, such as First-in-First-Out (FIFO), or other stacking or priority of removal.

There are alternative embodiments of the operational procedure 400 of FIG. 4. For example, the allocation of the data channel can further include reallocating an existing data channel for use by the mobile device in response to a determination that the priority score authorizes data channel preemption. For example, the channel management service 306 can be configured to reallocate a data channel that is actively used by another mobile device to service mobile device 100. For another example, in an embodiment, the priority table used by the channel management service 306 can include a relationship between reallocation and a priority score or score threshold. If a priority score is received from the prioritization service 306 that maps to reallocation the channel management service 306 can be configured to send a message to a channel allocation process of a base station controller 104 directing it to reallocate a data channel to service the request from the mobile device 100. In this embodiment, the network provider can configure the priority access system 112 to ruthlessly preempt individuals with lower priority in order to service higher priority data channel access requests. In a specific example, an individual or device can be selected to have its data channel preempted if their own data channel access request is known to be associated with a low priority score (e.g., a low priority user and/or a low priority endpoint), and the priority access system 112 then receives a request from a higher priority mobile device and/or for a higher priority endpoint. In this example the channel management service 306 can determine that there are no data channels are available to service the request (408), can determine to drop a user (420), and can reassign the data channel to the high priority mobile device and/or for a high priority endpoint associated with the data channel access request (422).

In another embodiment, as discussed above with respect to 428 of FIG. 4, the channel management service 306 of the priority access system 112 can generate a priority score that is associated with channel queuing. For example, the priority score can be within a range of scores associated with queuing or the priority score can be a single priority score associated with queuing. In this exemplary embodiment, the channel management service 306 can, for example, direct the base station controller 104 to store an identifier for the request in a queue and assign the next data channel that becomes available to one of the queued requests. In at least one exemplary embodiment, the length of time waiting in the queue can be used by the base station controller and/or the channel management service 306 to determine which request in the queue gets serviced in the instance that a data channel becomes available (e.g., a first-in first-out (FIFO) queue, a queue based strictly on the respective priorities of the requests and not based on wait-time or a time at which a request was added to the queue, etc.). In this example, the base station controller 104 can be configured to store the request for a short period of time, e.g., 3 seconds, before sending a denial message to the requesting mobile device 100. From the perspective of the user operating mobile device 100, they may simply think that the data channel is taking a bit longer to obtain than normal. In another embodiment, the request for the data channel can be queued and an immediate "deny" can be sent to the requesting device, and then that requested device can be paged when resources become available.

In another embodiment, the channel management service 306 can generate a priority score for a channel access request that results in a determination to deny the data channel access request, as shown in FIG. 4 at 426. For example, in an embodiment the network provider can configure the channel management service 306 to use a priority table that does not allow low priority requests to obtain data channels and the channel management service 306 can send a signal to the base station controller 104 directing the BSC 104 to deny the requests. In an example, consider a scenario whereby a sporting event has 100,000 spectators plus emergency personal on hand in case someone gets injured and/or to provide security for the venue. The security personal may include IP based handheld transceivers, e.g., walkie-talkies. In this situation the base station servicing the venue may be flooded with data channel access requests because of the volume of people in the area and the channel management service 306 can be configured to deny allocating data channels above a given threshold to requests with low priority scores in order to allow the emergency providers to access the data network in the event that there is an emergency.

In an embodiment, the data channel access request is associated with a voice-over-internet-protocol (VoIP) client. For example, in an embodiment, the application requesting a data channel can include a VOIP client 224. In one embodiment the VoIP client of the mobile device can use the data network to send and receive session initiation protocol (SIP) messages and the real-time transport protocol (RTP) for the voice path (e.g., although it is appreciated other embodiments need not be directed to SIP and/or RTP protocols). In this example, the VoIP request can be sent as data over the signaling channel and can include a call set-up message (e.g. SIP INVITE). For example, in an embodiment, the application requesting a data channel can include a PTT client 222. The PTT client 222 can manage PTT communications for mobile device 100. For example, the PTT client 222 can maintain access to PTT services, respond to communication requests, process all outgoing PTT requests, collect and package vocoder packets for originating PTT talk spurts, and/or parse packets of vocoder data for terminated PTT talk spurts.

Referring back to FIG. 4, in operation 422, the channel management service 306 can, in an exemplary embodiment, be configured to include a table that identifies each data channel in use (or currently allocated) and the priority score for the request that resulted in the allocation of each data channel. For example, in an EVDO system the base station controller 104 can include a number of Medium Access Control (MAC) Indices available for use by the base station. Each MAC index can corresponds to a different Walsh code, and when the base transceiver station 110 is in communication with the terminal, the MAC index can be used to identify the mobile device 100. The in-use MAC indices can be stored by the channel management service 306 along with the priority score for each in-use index. In this example, when the channel management service 306 determines to preempt an in-use channel it can send a signal to the base station controller 104 to reallocate the MAC index with, for example, the lowest priority to service the requesting mobile device.

Referring back to FIG. 4, decision 424 can include determining that the mobile device 100 issuing the request in 402 has the highest priority in the queue. For example, the channel management service 306 can receive a priority score that is associated with channel queuing and store the request in a queue. In this example, each request in the queue can be associated with a priority score and the channel management service 306 can be configured to determine when a channel becomes available and direct the base station controller 104 to assign the channel to the request in the queue that is associated with the highest score. In an example, the queue can include additional requests from other mobile devices that each have a priority score. In this exemplary embodiment the length of time in the queue can be less important than the priority score associated with the request, thus the request with the highest score can be assigned the next available data channel even if another request was in the queue longer. Alternatively, the wait-time for a queued request can be factored into the request's position in the queue along with the associated priority score.

In an alternative embodiment of the operational procedure 400 of FIG. 4, there can be an additional operation wherein the system 112 receives a signal indicating that a target remote device was assigned a data channel. Upon receiving the signal, the system 112 establishes a push-to-talk communication session with the target mobile device. For example, in one embodiment, a mobile device 100 may attempt to establish a PTT communication session with a target remote device such as mobile device 102. In this example, the priority access system 112, or a remote priority access system, can be configured to determine a priority score for the request. If the determined priority score is associated with preemption (e.g., as in 420 of FIG. 4), the priority access system 112 can send a signal to the base station controller 104 to allocate a data channel to service the request. In this example, the channel management service 306 can be configured to allocate a data channel to the remote mobile device 102 and/or send a signal to a remote priority access system to assign a data channel to the mobile device 102 and a push-to-talk communication session can be established.

In an exemplary situation where priority access systems are located at each base station controller in the mobile network, and the request is associated with queuing, either the priority access system 112, a remote priority access system, or both systems can manage the queuing process. For example, in an embodiment a plurality of base station controllers may be experiencing heavy use and a plurality of priority access systems may be triaging data channel access requests. In an embodiment, the channel management service 306 can determine that a request is associated with queuing and be configured to manage the allocation process for the plurality of priority access systems.

In an embodiment, the channel management service 306 can place the request in a queue and wait for a channel to become available. In this situation, when a channel becomes available the channel management service 306 can send a request to the base station controller 104 to assign the channel to service the request and send a preemption signal to the remote priority access system to preemptively assign a channel to service the request. Similarly, the remote priority access system could be configured to manage the connection request and act in a similar manner.

In another embodiment, the channel management service 306 can place the request in a queue and the remote channel management service can place the request in another queue. In the instance, if one or more of the plurality of base station controllers obtain data channels within a predetermined time period then the one or more of the plurality of base station controllers can be assigned to service the request; otherwise the connection request can be failed if no base station controllers obtain the data channels within the predetermined time period.

The PTT communication session can be established in an embodiment of the present invention by engaging a PTT client 222 of the mobile device. The PTT client 222 in this exemplary embodiment can transmit a data channel access request for establishing a direct PTT call with the target mobile device 102 that can also have a PTT client. The call setup request (or call message) can contain, for instance, the target user address, and information associated with the mobile device. The call setup request may also be sent with a Data-Over-Signaling (DOS) access channel message. A vocoder can be assigned and the target mobile device 102 can be notified that a PTT call is being established. The target PTT client can send an acknowledgement to the base station controller indicating that the call has been accepted. Once the acknowledgement is received from the target PTT client, a floor grant message can be sent to the originating PTT client 222, which indicates the call is being established and the PTT client of the target mobile device 100 has the floor.

Figure 5:
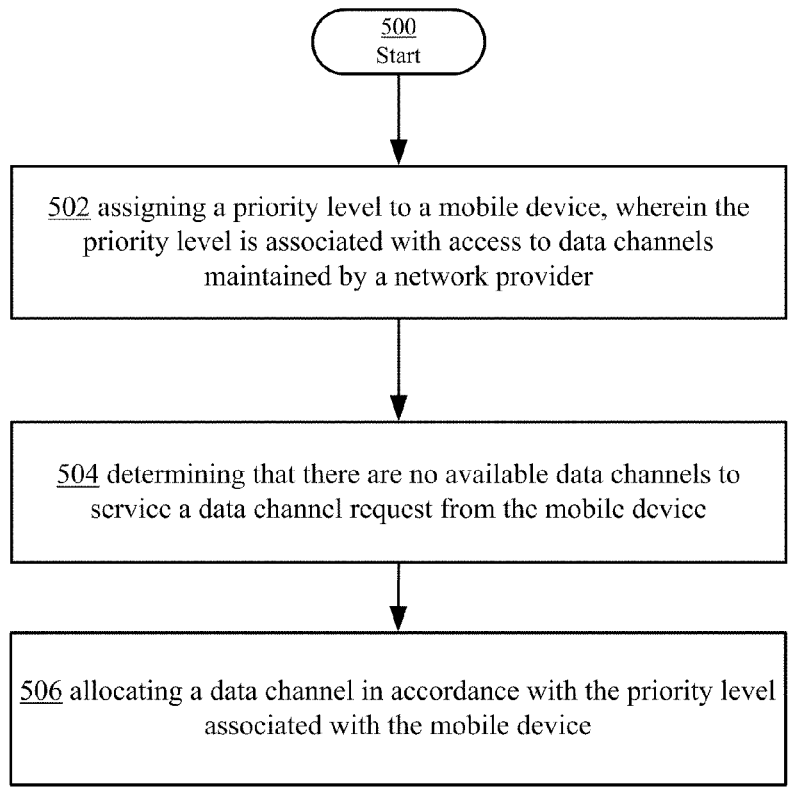
FIG. 5 illustrates an operational procedure related to prioritizing access to data channel resources in accordance with an embodiment of the invention.

Referring now to FIG. 5, an exemplary embodiment related to prioritizing access to data channels including operations 500-506 is shown. Operation 500 begins the operational procedure and operation 502 illustrates assigning at least two priority levels to a mobile device for access to data channels maintained by a network provider, wherein at least one priority level is associated with a priority level for the mobile device. For example, in an embodiment of the present invention a priority level can be assigned to a mobile device 100 by associating a mobile device identifier (e.g., such as a 10 digit number identifying the subscriber or the international mobile station identity) with a priority level, and storing the relationship in the database 122 or look-up table of the core network 120. Similar to that described above, the priority level in an exemplary embodiment can be used by a prioritization service 112 to determine whether a particular user that requests services should be given priority access to the mobile data network. In an exemplary embodiment, the network provider can use predetermined criteria for assigning priority levels to mobile devices that take into account the monthly fee charged to the user for priority access, the status of the user associated with the mobile device, e.g., whether he or she is an emergency service provider, the entity that the network provider is providing services for, e.g., the police department or another government entity, etc. More specifically, in an example, a network provider can create a tiered priority leveling scheme that, for example, assigns the highest priority to mobile devices used by an emergency service providers and the lowest priority to users that pay a standard monthly fee.

Continuing with the description of FIG. 5, operation 504 illustrates determining that there are no available data channels currently available to service a data channel access request from the mobile device. For example, and in addition to the previous example, a base station controller 104 in an embodiment can include a finite number of data channels. In an exemplary mobile network that uses EVDO, the base station controller 104 can include a certain number or MAC indices available for use and each index can correspond to a data channel. Each MAC index can correspond to a different Walsh code and when in communication with the terminal, the base transceiver station 110 can use a MAC index to identify mobile device 100. In this example, the base station controller 104 can be configured to monitor the available MAC indices and send a signal to the priority access system 112 when indices become available. In an alternative embodiment, each data channel access request can be processed by the priority access system 112 and the in-use MAC indices as well as the available indices can be stored in table accessible by the channel management service 306. In this example, the priority access system 112 can be configured to pass data channel access requests through the system without prioritizing them if indices are available and if a determination is made that data channels are unavailable the priority access system 112 can be configured to start prioritizing requests.

Referring now to operation 506, a data channel is allocated to the mobile device in accordance with the priority levels associated with the mobile device. For example, in an embodiment, data channels can be allocated to requests based on the request's priority level (i.e., the priority level indicated by the request and/or the priority level associated with the requesting mobile station). The channel management service 306 can include a priority table that maps priority levels associated with mobile devices to different actions, at least one of which can be an action related to the allocation of data channels. In an exemplary embodiment, the channel management service 306 can be configured to allocate an in-use data channel to service the request. In exemplary embodiments, different priority tables can be used by the channel management service 306 depending on different situations. The priority table can be loaded when the channel management service 306 is initialized and a new priority table can be dynamically loaded by an administrator via an interface 310, or when a predetermined triggering condition occurs. The predetermined triggering condition can include one or more of a weakening or loss of signal from neighboring base transceiver stations, receiving a high volume of data channel access requests within a predetermined amount of time, and/or receiving information from the core network 120 that indicates that the network is experiencing difficulty.

Figure 6:
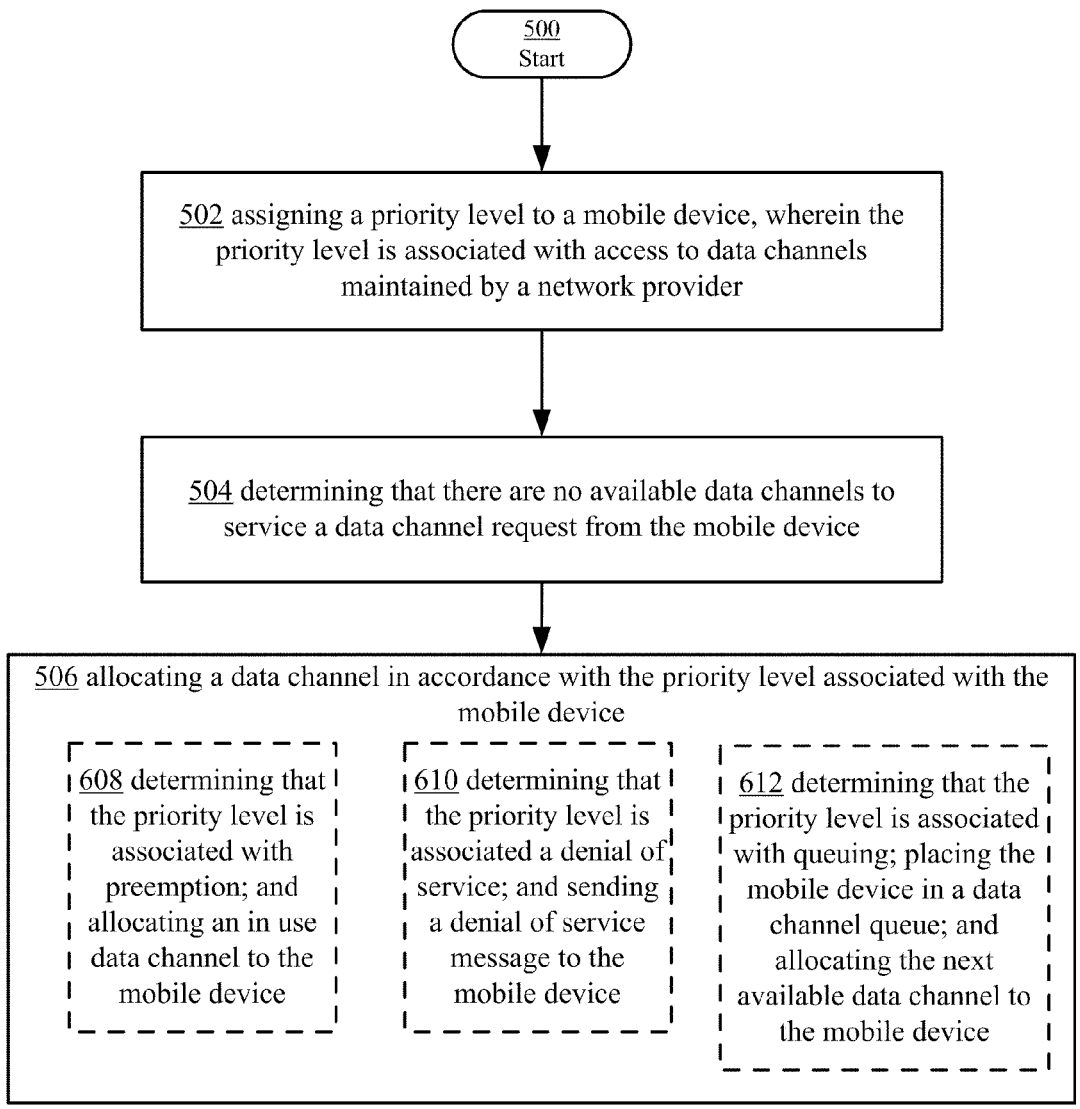
FIG. 6 illustrates a more detailed example of the process of FIG. 5 in accordance with an embodiment of the invention.

FIG. 6 illustrates a more detailed example of the process of FIG. 5. In particular, FIG. 6 expands upon block 506 from FIG. 5. Referring to FIG. 6, within block 506, three alternative implementations of block 506 are shown as optional blocks or operations 608, 610 and 612. Block 608 shows a determining that at least one priority level is associated with preemption. For example, the at least one priority that results in a determination to preempt a data channel that is already allocated to another mobile station for allocation to the requesting mobile station can be that the priority level of the requesting mobile station or a service-type priority level of the request is a maximal value (e.g., a very important mobile station and/or a very important call). Upon determining preemption in 608, an in-use data channel is allocated to the mobile device. For example, in an embodiment of the present invention the channel management service 306 can be configured to reallocate a data channel that is being used by another mobile device to service the requesting mobile device 100. For example, in an embodiment the priority table used by the channel management service 306 can include a relationship between reallocation and a priority level(s). If a priority level is received from the prioritization service 306 that is mapped to reallocation, the channel management service 306 can be configured to send a message to a channel allocation process of a base station controller 104 directing it to reallocate a data channel to service the request from the mobile device 100. In this embodiment, the network provider can configure the priority access system 112 to ruthlessly preempt individuals with lower priority in order to service higher priority data channel access requests. In a specific example, a data channel may be in use by a request with a low priority level, e.g., a low priority user, and the priority access system 112 may receive a request from a high priority mobile device and/or for a high priority call. In this example the channel management service 306 can be configured determine that there are no data channels available to service the request, to determine to drop a user, and to reassign the data channel to the high priority mobile device to service the data channel access request.

Referring to FIG. 6, operation 610 shows determining that the priority level of the mobile station and/or the service-type priority level (i.e., the requested priority level of the call) are associated with a denial of service, after which the priority access system 112 sends a denial of service message to the mobile device. For example, in an embodiment the channel management service 306 can determine that the priority level (s) for with the channel access request is associated with a denial of service (e.g., the mobile station has a low-priority, the mobile station indicates that the service-type for the call is a low priority, etc.). The network provider can configure the channel management service 306 to use a priority table that does not allow low priority requests to obtain data channels and the channel management service 306 can send a signal to the base station controller 104 directing it to deny the requests.

Referring to FIG. 6, operation 612 shows the determining that a priority level of the mobile station and/or the service-type priority level (i.e., the requested priority level of the call) is associated with queuing, after which the request from the mobile device is placed in a data channel queue. When a data channel becomes available for allocation to the mobile device, the data channel is allocated to the mobile device and the request is removed from the queue. For example, in an embodiment, the channel management service 306 can receive a priority level (e.g., a device-specific or service-type priority level) that is associated with channel queuing. In this exemplary embodiment, the channel management service 306 can, for example, direct the base station controller 104 to store an identifier for the request in a queue and assign the next data channel that becomes available to the mobile device that issued the request. In at least one exemplary embodiment, the length of time waiting in the queue can be used by the base station controller and/or the channel management service 306 to determine which request gets serviced when a data channel becomes available. In this example, the base station controller 104 can be configured to store the request for a short period of time, e.g., 3 seconds, before sending a denial message to the requesting mobile device 100. From the perspective of the user operating mobile device 100, the user may simply think that the data channel is taking a bit longer to obtain than normal while in reality his or her request is being stored in a queue.

Figure 7:
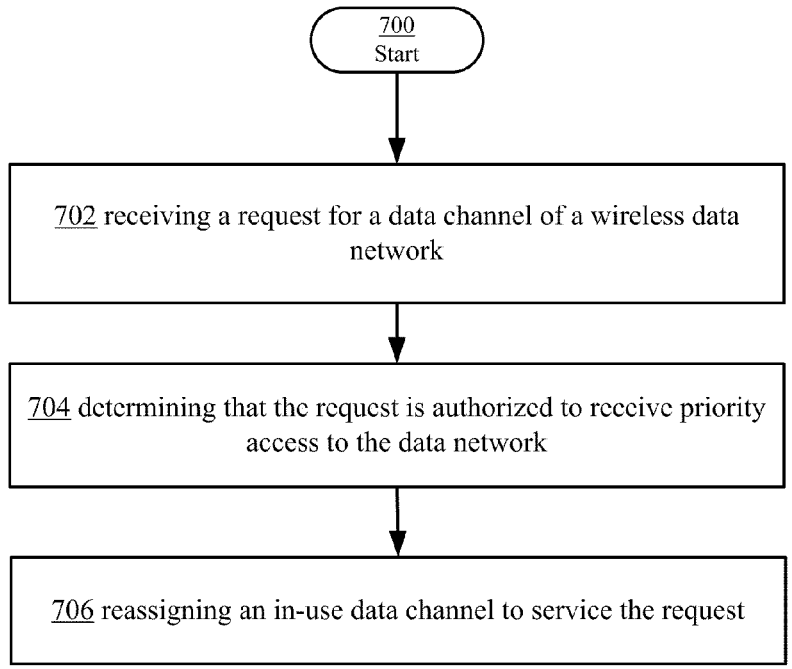
FIG. 7 illustrates an operational procedure related to data channel access techniques in accordance with an embodiment of the invention.

FIG. 7 illustrates an exemplary operational procedure related to data channel access techniques including operations 700-706. Operation 700 begins the operational procedure and operation 702 illustrates receiving a request for a data channel of a wireless data network. For example, a data channel access request can be received by a base transceiver station 110 from, for example, a mobile device 100 or any other device that includes wireless capabilities such as a laptop with a wireless adaptor. As illustrated by FIG. 3, the data channel access request can be trapped by forwarded to the access system 112 and routed to a parser 304 therein. As discussed above with respect to other embodiments, the data channel access request can be received by the priority access system 112 from the base station controller 104, or alternatively the data channel access request can be routed to the priority access system 112 prior to being routed to the base station controller 104. In either example, the priority access system 112 can be configured to selectively preempt data channel access requests based on associated priority levels and/or scores when the data network is under heavy use. For example, each base transceiver station 110 may only have a limited number of data channels that can be provided and in this example, the priority access system 112 can be enabled when the base station controller 104 has assigned all available data channels (e.g., or a high-number of the available data channels) and/or has received data access requests message at a high frequency. In another exemplary embodiment, an administrator of the wireless network can manually enable the priority access system 112.

Referring to FIG. 7, in operation 702, the priority access system 112 determines that the request is authorized to receive priority access to the data network. In 702, being authorized to achieve priority access means that, if necessary, one or more other data channels currently allocated to other mobile devices can be re-allocated to the requesting mobile device. For example, the priority access system 112 or 300 can be configured to determine that the request is entitled to receive priority access to the data network. For example, parser 304 can be configured to parse a data channel access request for information that identifies the source of the request and/or a service-type priority level associated with the request. In an example where the data channel access request includes an identifier, the parser 304 can send a signal to a database 122 that can be, for example, coupled to the AAA 114 of FIG. 1. The signal can include a request for the priority level associated with the identifier. A database management program of the database 122 can search for the identifier, obtain an associated priority level and send the associated priority level back to the parser 304 for example. Once the parser 304 obtains the priority level, the priority level can be sent to a channel management service 306. For example, the channel management service 306 can be configured to determine a priority score for the request using the priority level. As will be appreciated, the identifier contained in the data channel access request can include an identifier of the requesting user or mobile station from which a mobile device priority level is ascertained, and/or a service-type priority level that indicates a requested priority level by the user or mobile device for a particular call.

In an exemplary embodiment, the priority score can simply correspond to the mobile-device priority level or the service-type priority level. However in other exemplary embodiments the priority level(s) associated with the data channel access request can be factors that are used in part to calculate the priority score for the request. For example, different algorithms can be used by the priority service 306 depending on the preference of the network administrator. For example, in an embodiment the priority score generating algorithm can additionally factor in information such as the priority level associated with the target IP endpoint. The target endpoint in this embodiment could include a mobile device using PTT or VoIP, a website, or a networked based service such as an email server or a map program. In this example, the request can additionally include an identifier associated with the endpoint and a priority score for the request can be calculated that takes into account the perceived importance of the target endpoint (e.g., potentially, in conjunction with the priority level of the requestor and/or the service-type priority level of the request).

Referring to FIG. 7, in operation 702, the priority access system 112 reassigns an in-use data channel to service the request. In an exemplary embodiment of the present invention, the priority score for the request can indicate that the request is entitled to receive priority preemption service and a data channel that was previously allocated to another mobile device can be reassigned to the requesting mobile device in order to service the request. For example, the base transceiver station 110 in this embodiment may have finite data channels available to service requests. When each of the data channels (e.g., or at least, a high-number of data channels) are in-use or currently allocated, the priority access system 112 can be configured in this embodiment to drop an in-use data channel and reassign the dropped or newly available data channel to the requesting mobile device to service the request. For example, a person may be talking over a VoIP communication link and a requestor may send a data channel access request to the base transceiver station 110. In this example, the priority score for the request can be determined and sent to a channel management service 306. The channel management service 306 can be configured to determine that the request is entitled to preemption and send a signal to a process in the base station controller 104 directing the base station controller 104 to drop the VoIP call and reassign the data channel to service the request.

Figure 8:
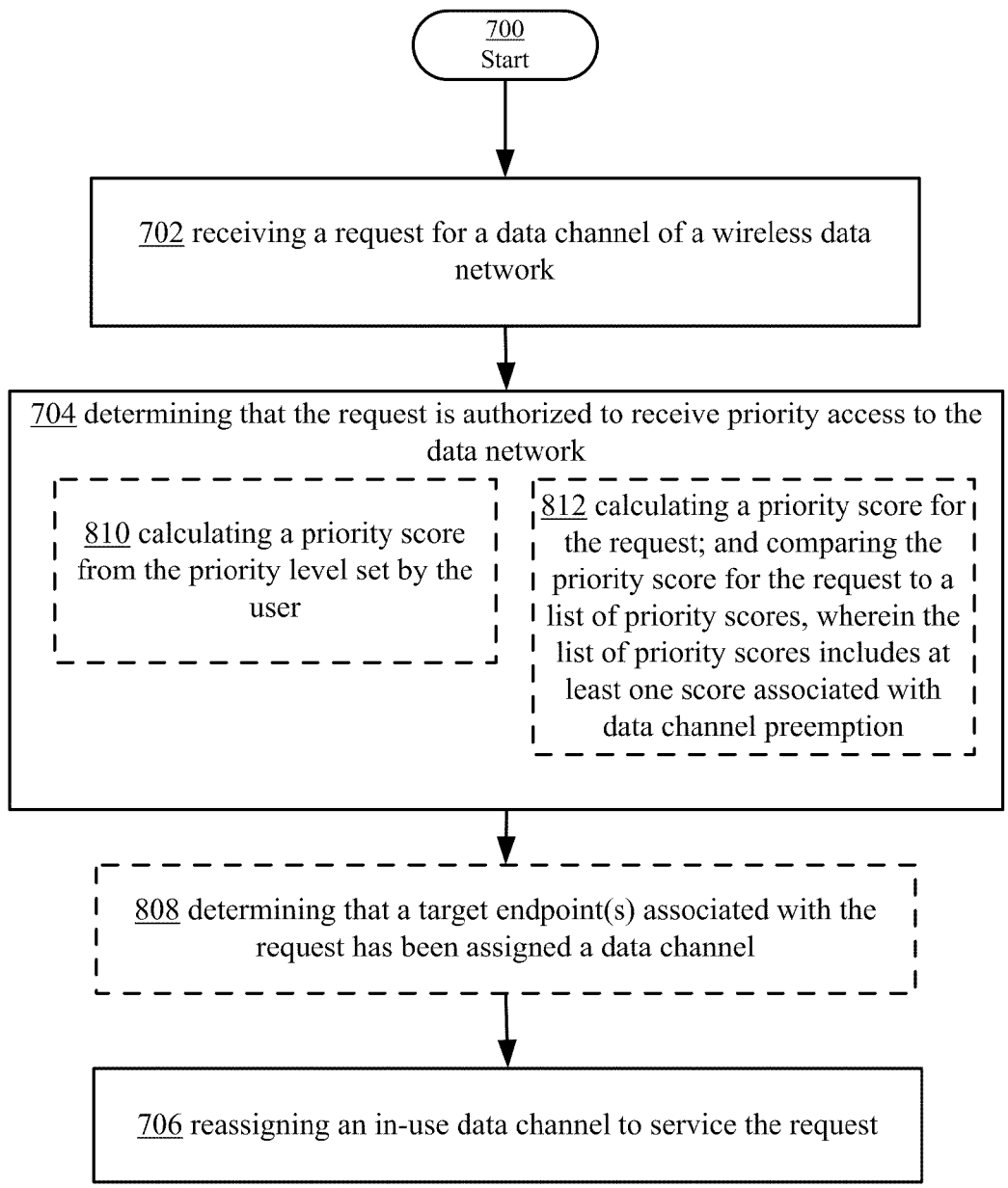
FIG. 8 is directed to example implementation of the process of FIG. 7.

FIG. 8 is directed to an example implementation of the process of FIG. 7. In particular, FIG. 8 illustrates FIG. 7 with operations 810 and 812 being performed during operation 704 from FIG. 7, and operation 808 being performed after operation 704 and before operation 706 of FIG. 7.

Referring to FIG. 8, in 808, the priority access system 112 determines that a target endpoint associated with the request has been assigned a data channel. For example, the channel management service 306 can be configured to determine that the target endpoint is capable of receiving communication signals prior to reassigning an in-use data channel to service the request to verify the preemption will be fruitful for the priority call. For example, the target endpoint can include a device that requires access to a data channel in order to communicate with the requesting mobile device 100. If the target endpoint cannot receive a data channel then channel reassignment for the requesting mobile device 100 is not a valuable operation. In this example, the channel management service 306 can be configured to determine that the target endpoint is available, and/or transmit a signal to a remote priority access system 300 in the instance that priority access for the endpoint is controlled by a separate priority access system requesting information indicating that the target endpoint has been assigned a data channel. For example, the channel management service 306 can obtain a priority score for the request and send a signal to a remote priority access system located elsewhere in the mobile network, e.g., at a remote base station controller. In this example, the remote priority access system can treat the signal from priority access system 300 as a data channel access request for the target endpoint and can process the request in a manner similar to that described above. The channel management service 306 can, in this example, receive a signal indicating that the target endpoint has been assigned a data channel and the channel management service 306 can be configured to send a signal to the base station controller directing the base station controller to assign a data channel to the requesting mobile device 100, which occurs in operation 706. Thus, in the embodiment of FIG. 8, the priority access system 112 waits for the target endpoint to obtain its own data channel before re-allocating a data channel to the requesting mobile device.

Referring to FIG. 8, in 810, the priority access system 112 calculates a priority score based at least in part upon the service-type priority level set by the user or the requesting mobile device. For example, a priority score for the request can be calculated by the channel management service 306 using an algorithm that takes into account the service-type priority level. For example, in an embodiment an administrator of the network can configure the channel management service 306 via an interface 308 and set the channel management service 306 to use an algorithm that calculates priority scores from priority levels available to the user. In a disaster situation the administrator could configure the channel management service 306 to allow any user to obtain a data channel associated with an emergency call. The channel management service 306 in this exemplary embodiment can be configured to receive information from the parser 304 that identifies the priority level of the caller.

Referring to FIG. 8, in 812, the priority score for the request can be calculated. After calculating the priority score for the request, the channel management service 306 can be configured to access a table stored in memory that identifies which algorithm to use and calculate the priority score using the identified algorithm. The channel management service 306 can then compare the calculated priority score to a table of priority scores that map to data channel preemption. In this example, if the calculated priority score is high or above a threshold (e.g., the requester could be trying to contact 911), then the channel management service 306 can determine that the priority score of the request is entitled to data channel preemption. In this example, the channel management service 306 can be configured to send a signal to the base station controller 104 directing the base station controller 104 to reassign a data channel to the request.

Figure 9:
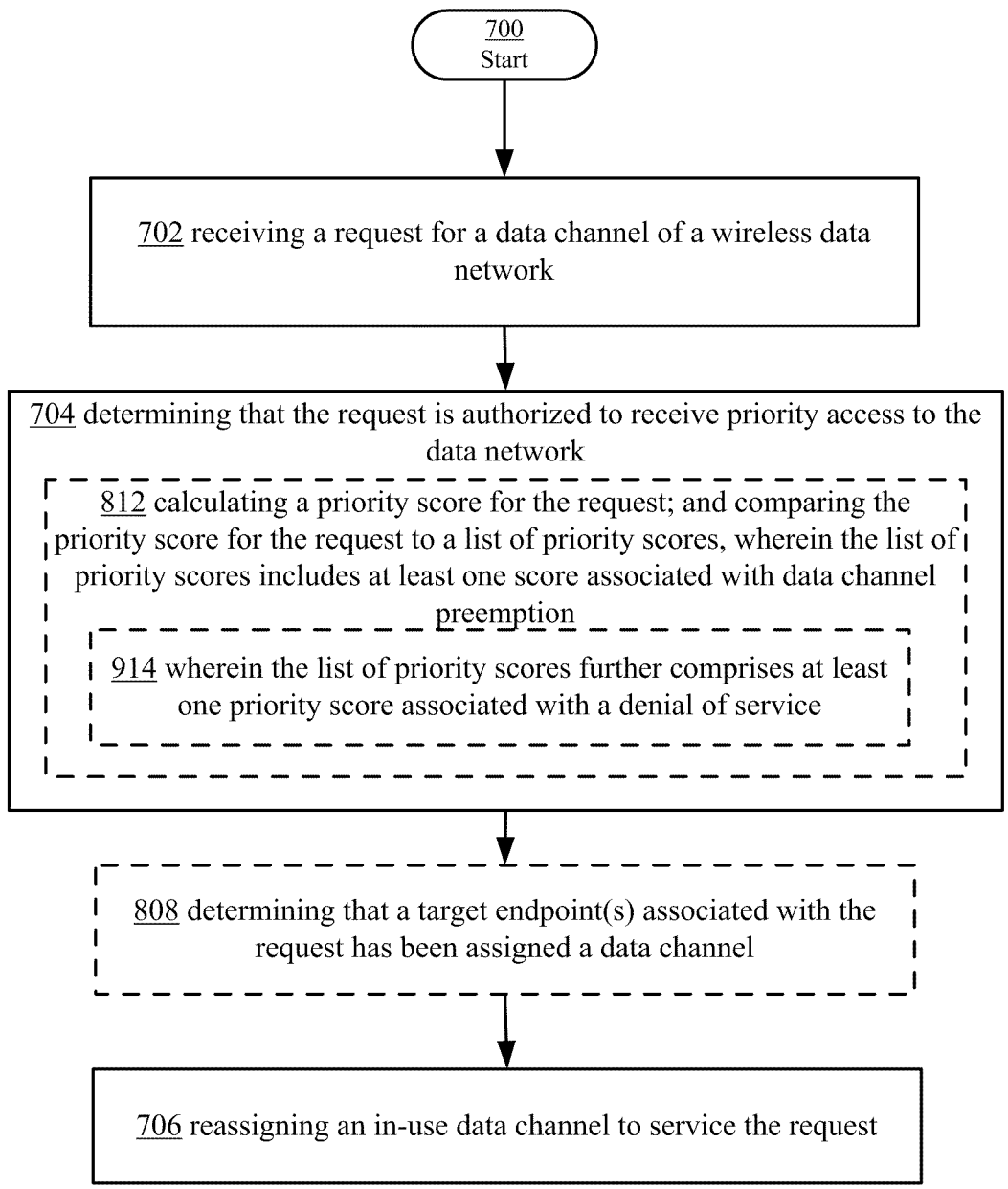
FIG. 9 is directed to another example implementation of the process of FIG. 7.

In an example, the priority score that is calculated in 812 can be calculated from factors such as a priority level associated with the requestor, a priority level associated with the target endpoint, a service-type priority level for the call, and/or a combination thereof. In this example, the priority score can be generated and the channel management service 306 can query a database to determine how to treat the request in view of the calculated priority score. In this example, the channel management service 306 can send the calculated score 306 to a database management program that maps the range of possible scores to different actions, one of which can be data channel preemption in this example FIG. 9 is directed to another example implementation of the process of FIG. 7. In particular, FIG. 9 illustrates FIG. 7 with operations 812 being performed during operation 704 from FIG. 7 (as in FIG. 8) and operation 914 being performed during operation 812, and operation 808 being performed after operation 704 and before operation 706 of FIG. 7 (also as in FIG. 8).

Referring to FIG. 9, during operation 704, the set of priority scores that the calculated priority score is compared against in 812 includes at least one priority score that is associated with a denial of service for the request, 914. Accordingly, if the calculated priority score corresponds to the at least one priority score associated with the denial of service, then the request is determined to be denied. For example, the priority score can be calculated from factors such as a priority level associated with the requestor, a service-type priority level and/or a combination thereof. The priority score can then be sent to a database management program that maps the range of possible scores to different actions, one of which can be data channel preemption in this example and another action can be related to denial of service. A denial of service signal can be sent back to the channel management service 306 that can be processed by the channel management service 306. In this example, the channel management service 306 can be configured to send a signal to the base station controller channel allocation process directing it to deny the data channel access request. The base station controller can, in this example, receive the signal from the priority access system 300 and send a denial message over the broadcast control channel to the requestor.

Figure 10:
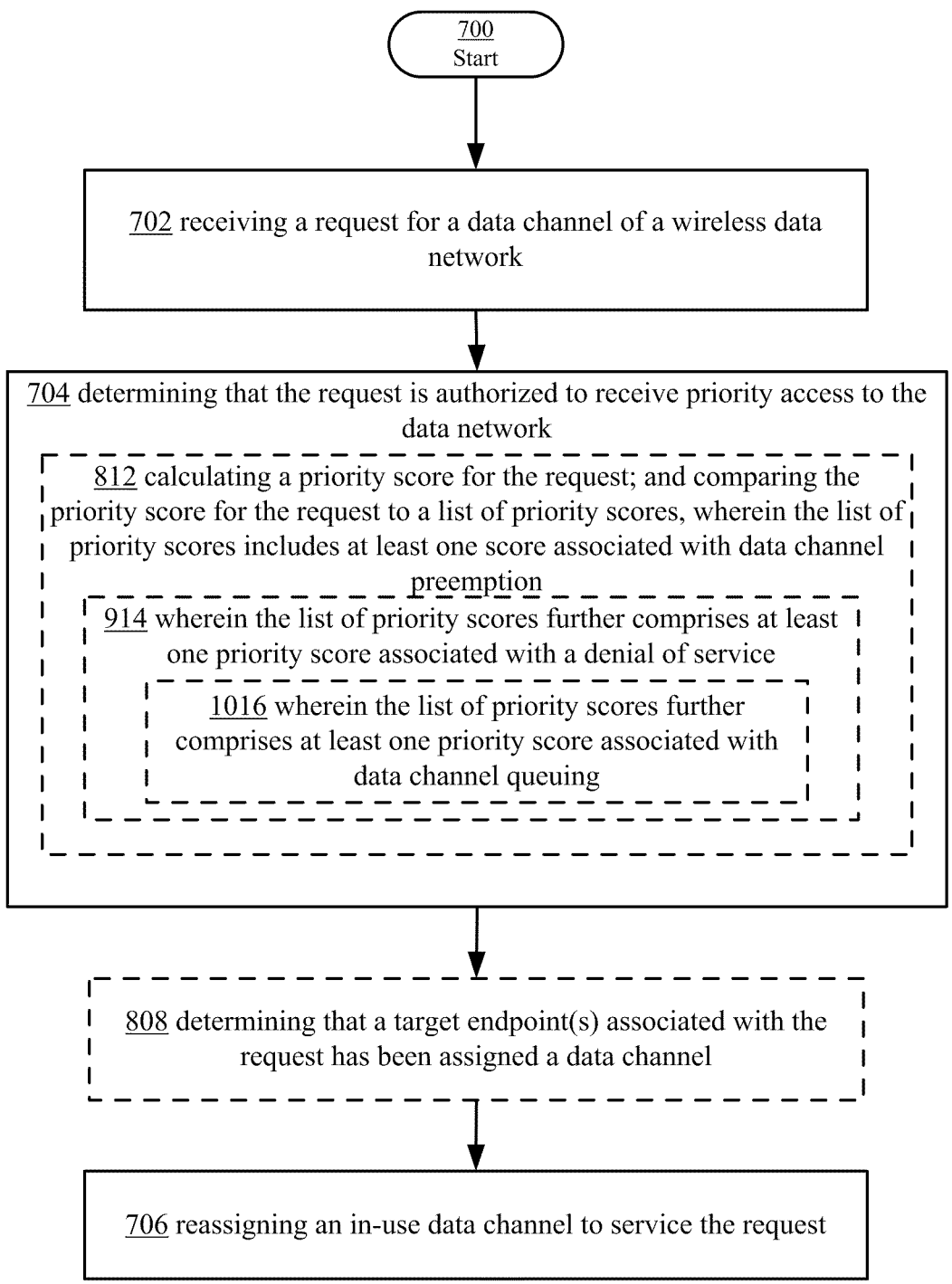
FIG. 10 is directed to another example implementation of the process of FIG. 7.

FIG. 10 is directed to another example implementation of the process of FIG. 7. In particular, FIG. 10 illustrates FIG. 7 with operations 812 being performed during operation 704 from FIG. 7 (as in FIG. 8), operation or condition 914 being performed during operation 812 (as in FIG. 9) and further shows an operation 1016 being performed within operation 914, with operation 808 being performed after operation 704 and before operation 706 of FIG. 7 (also as in FIG. 8).

Referring to FIG. 10, the set of priority scores that the calculated priority score is compared against in 812 includes at least one priority score that is associated with a denial of service for the request, 914, and also includes at least one priority score that is associated with data channel queuing. Accordingly, if the calculated priority score corresponds to the at least one priority score associated with the data channel queuing, then the priority access system 112 either queues or directs the base station controller 104 to queue the data channel access request. For example, the priority score can be calculated from factors such as a priority level associated with the requestor, a service-type priority level and/or a combination thereof. The priority score can then be sent to a database management program that maps the range of possible scores to different actions, one of which can be data channel preemption in this example, another action can be related to denial of service, and yet another action can be related to data channel queuing. For example, in an embodiment the channel management service 306 can calculate a priority score and send the calculated priority score to a database management program. In this example, the channel management service 312 can place the request in a queue and assign the next data channel to the request. In an embodiment, a certain priority score or range of scores can be associated with queuing. When the channel management service 306 receives the request, the channel management service 306 can place the request in the queue if the request is associated with the priority score(s) for queuing. Later, when the channel management service 306 determines that a channel becomes available for the queued request, the channel management service 306 can send a signal to the base station controller and direct the base station controller 104 to allocate the free data channel to service the request from the mobile device 100, as shown at operation 706.

Figure 11:
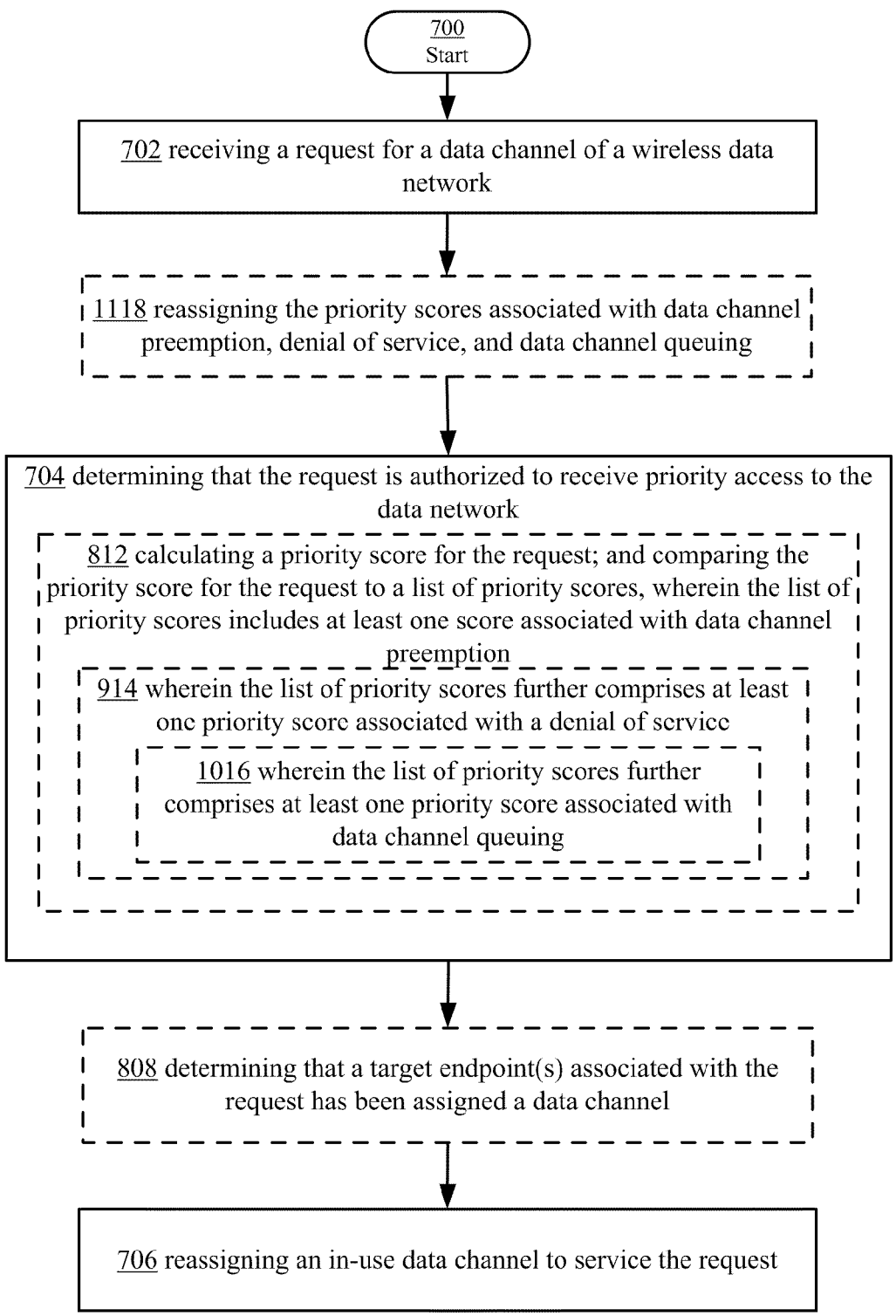
FIG. 11 is directed to another example implementation of the process of FIG. 7.

FIG. 11 is directed to another example implementation of the process of FIG. 7. In particular, FIG. 11 is similar to FIG. 10 except for an additional operation 1118 being performed between operations 702 and 704. Accordingly, a description of FIG. 11 other than operation 1118 has been omitted for the sake of brevity.

Referring to FIG. 11, after the priority access system 112 receives the data channel access request in 702, the priority access system 112 re-assigns one or more of the priority scores associated with data channel preemption, denial of service, and/or data channel queuing. For example, in an embodiment of, an administrator can reconfigure the priority scores associated with different actions such as data channel preemption, denial of service, and data channel queuing. For example, the service provider can generate different priority score lists and store them in a database. The priority score lists can be associated with different conditions such as time of day, and/or day of the week. The priority score lists can also be associated with other conditions like an emergency. The list that the channel management service 306 uses can be changed based on demand and/or the priority scores can be reassigned in response to different triggering events or actions.

For example, in one embodiment a priority score list can include 15 different priority scores For example, among the 15 different priority scores in the priority score list in this example, priority scores 1-3 can be mapped to data channel preemption, scores 4-12 can be mapped to data channel queuing and scores 13-15 can be associated with denial of service. In this example, a signal can be received by the database management program indicating that an emergency situation has occurred. The signal indicating the emergency situation can function as a triggering event to load a new priority list into active memory (e.g., RAM) that remaps the priority scores 1-2 to data channel preemption, and scores 3-6 can be mapped to data channel queuing and scores 7-15 can be associated with denial of service. In this example, if the data channels are under heavy use, high priority users such as police officers and emergency personal can obtain access to the data network while other users can be queued or denied service. While operation 1118 is shown as occurring after operation 702 and before operation 704 in FIG. 11, it will be appreciated that the reassignment(s) of operation 1118 can occur at any point during operation of the priority access system 112, and need not be performed within the process of FIG. 11 in other embodiments.

Figure 12A:
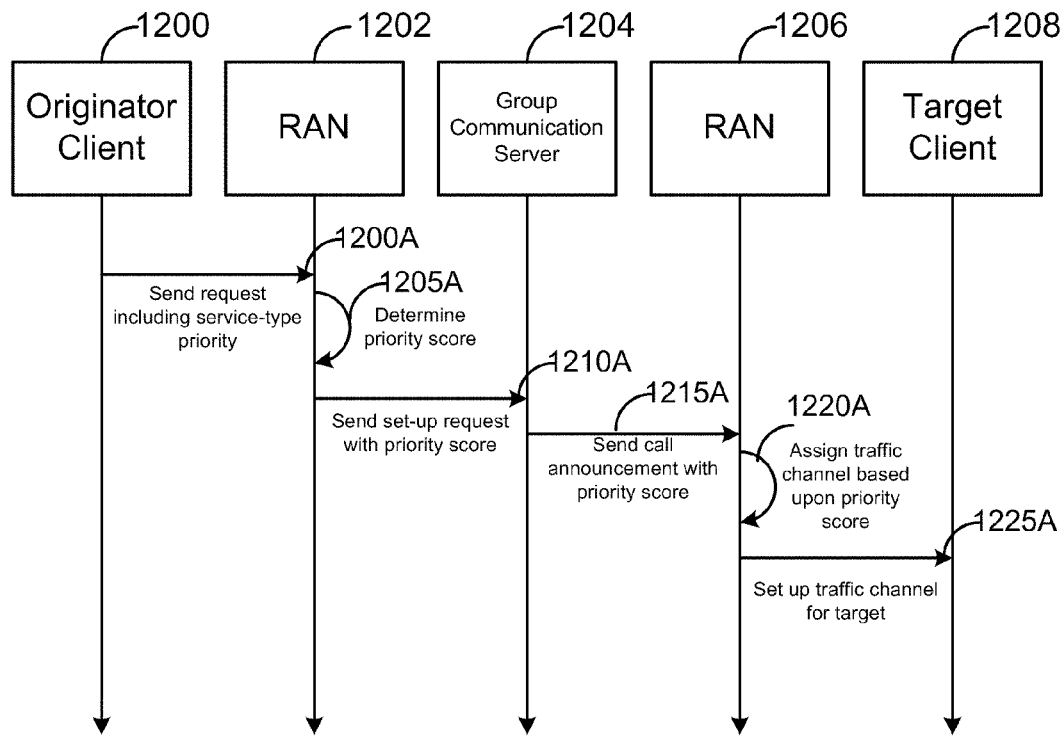
FIG. 12A illustrates a process of requesting and allocating data channels within a wireless communication system in accordance with an embodiment of the invention.

FIG. 12A illustrates a process of requesting and allocating data channels within a wireless communication system in accordance with an embodiment of the invention. Referring to FIG. 12A, an originating wireless communication device 1200 sends a request for a data channel resource to its serving RAN 1202, 1200A. The request of 1200A can include a request for both TCH or physical-layer resources as well as IP-layer resources (e.g., QoS, an IP address, etc.), in an example. In 1200A, the data channel access request includes a service-type priority requested by a user of the originating wireless communication device. Accordingly, in 1205A, the RAN 1202 (e.g., the priority access system 112 or 300 within the RAN 1202) makes the determination of the priority score for the originator 1200 based upon one or more of (i) a priority level associated with the originating wireless communication device 1200, (ii) the requested service-type priority level and/or (iii) a priority level associated with the target communication device 1208. The RAN 1202 then forwards a set-up request (e.g., a call message) for a group communication session for which the data channel is requested to a group communication server 1204, 1210A. In an example, the set-up request of 1210 corresponds to a request for the group communication server to allocate its own resources for supporting (e.g., hosting) the group communication session. In 1210A, the set-up request is sent to the group communication server 1204 along with the priority score determined by the RAN 1204 in 1205A. The group communication server 1204 receives the set-up request and sends a call announcement for announcing the group communication session along with the priority score of the originating client 1200 to the RAN 1206 for a target wireless communication device 1208. The group communications server 1204, in this embodiment, will simply forward the priority score to the serving RAN 1206 of the target 1208, 1215A. The RAN 1206 will determine to assign a traffic channel or otherwise allocate a data channel to the target 1208 based upon the priority score of the originator 1200, 1220A. For example, if the RAN 1206 has a number of available data channels, a traffic channel (TCH) can be determined to be assigned to the target 1208 without data channel preemption in 1220A. Alternatively, if the RAN 1206 a low number of available data channels (e.g., zero, lower than a threshold number, etc.), the RAN 1206 can evaluate the priority score and apply data channel preemption protocols as discussed in the above embodiments in order to determine a data channel for allocation to the target 1208, if possible. The RAN 1206 can then setup the traffic channel for the target 1208, 1225A, and may otherwise notify the target 1208 of the incoming group communication and its priority level (e.g., by sending an announce message to the target 1208, etc.). For example, while not shown explicitly in FIG. 12A, setting up the TCH in 1225A can include paging the target 1208 after which the TCH is assigned to the target 1208. Then, after the TCH is set-up with the target 1208, the call announcement message from 1215A can be sent to the target 1208 on the downlink of the TCH.

Figure 12B:
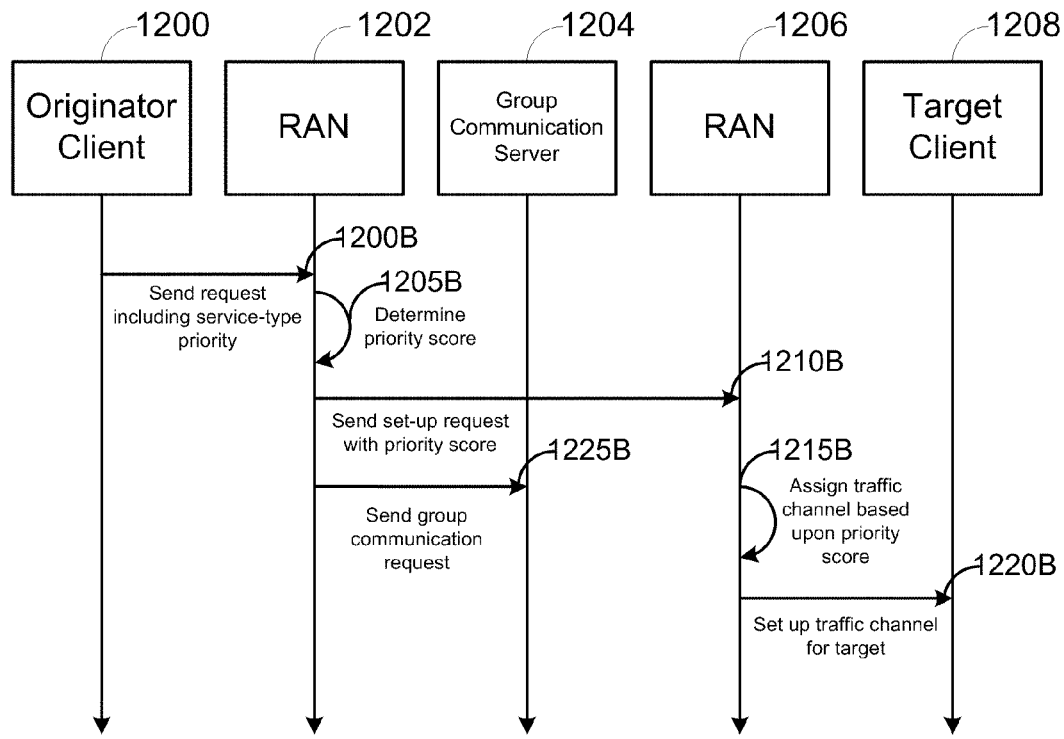
FIG. 12B illustrates another process of requesting and allocating data channels within a wireless communication system in accordance with an embodiment of the invention.

FIG. 12B illustrates another process of requesting and allocating data channels within a wireless communication system in accordance with an embodiment of the invention. Unlike the embodiment of FIG. 12A, the priority score is conveyed to the RAN 1206 of the target wireless communication device 1208 independent of the group communication request sent from the serving RAN 1202 of the originating wireless communication device 1200 to the group communication server 1204. In this embodiment, the RAN 1202 receives the data channel access request from the originator 1200, 1200B. The request of 1200B can include a request for both TCH or physical-layer resources as well as IP-layer resources (e.g., QoS, an IP address, etc.), in an example. The RAN 1202 determines the priority score of the data channel access request, 1205B (e.g., as in 1205A of FIG. 12A).

After determining the priority score for the data channel access request in 1205B, the RAN 1202 forwards the data channel access request and the associated priority score to the RAN 1206 of the target wireless communication device 1208 to request that the RAN 1206 set-up a data channel with the target wireless communication device 1208, 1210B. By contrast, in FIG. 12A, the priority score is first conveyed to the group communication server 1204, which in return conveys the priority score to the RAN 1206 that is serving the target wireless communication device 1208. Upon receiving the forwarded data channel access request, in 1215B, the RAN 1206 can then either immediately setup and assign a traffic channel based upon the receipt of the priority score, or alternatively the RAN 1206 can wait for subsequent signaling from the group communication server 1204 indicating that group communication is being setup by the group communication server 1204. Accordingly, the TCH is set-up with the target 1208 in 1220B (e.g., by paging the target 1208 and then sending a TCH assignment message).

It should be appreciated that the RAN 1206 of the target 1208 can allocate data channels to the target wireless communication device 1208 in the same manner as shown in FIG. 4. In other words, depending on the availability of data channels for allocation by the RAN 1206, the allocation of the data channel to the target wireless communication device 1208 can be immediate, after a given period of time in a queue or can be denied altogether (e.g., if the priority score is very low). In an example, the priority score associated with the forwarded data channel access request can override a priority that is specifically associated with the target wireless communication device 1208. For example, the originating wireless communication device 1200 can be a high-priority device and the target wireless communication device 1208 can be a low-priority device. In this case, the priority score is high because the originating wireless communication device 1200 is a high-priority device, and the data channel allocation to the target wireless communication device 1208 would be given a higher priority by virtue of the importance of the originating wireless communication device 1200.

In addition to the RAN 1202 forwarding the request in 1210B to initiate set-up of the target's 1208 data channel resources, the RAN 1202 can also send a group communication request to the group communication server 1204 to request that the group communication server allocate its own resources for supporting (e.g., hosting) the group communication session. In this case, the group communication server 1204 can send an announcement message for the group communication session as shown above in 1215A of FIG. 12A (e.g., with or without the priority score). It will be appreciated that 1225B is performed in case the group communication session is configured for arbitration by the group communication server 1204. In the alternative case that the group communication session is to be set-up as a point-to-point call between the originator client 1200 and the target client 1208, it will be appreciated that 1225B can be omitted altogether from FIG. 12B.

It will be appreciated that the above-described group communication sessions can be implemented via IP-multicasting protocols and/or IP-unicasting protocols. In the case that the group communication session is implemented as half-duplex via IP-multicasting protocols, in an example, only the call originator (or new floor-holder) may receive a priority score for data channel preemption. In other words, the targets of the multicast session need not be allocated a preemption priority for joining the call, whereas the speaker (e.g., the call originator or initial floor-holder) of the group communication session will be given a higher priority worthy of preemption.

Further, above-described embodiments have generally been described whereby the call originator and call targets are wireless devices. In another embodiment, one or more of the call participants may correspond to wired devices. In at least one embodiment of the invention, the above-described processes related to data channel resource preemption may be performed for wireless devices and can be omitted or skipped for wired devices. For example, there is generally more contention for wireless resources as compared to wired resources, such that data channel resource scarcity would not be expected in a wired environment. However, this does not preclude the possibility of a resource-limited wired environment in which case the processes described above can be used for resource preemption/allocation in such an environment.

The foregoing detailed description has set forth various embodiments of the systems and/or processes via examples and/or operational diagrams. Insofar as such block diagrams, and/or examples contain one or more functions and/or operations, it will be understood by those skilled within the art that each function and/or operation within such block diagrams, or examples can be implemented, individually and/or collectively, by a wide range of computer logic that can be instantiated in hardware, software, firmware, or virtually any combination thereof.

The methods and systems discussed herein may be implemented, in whole or in part, on a computer readable product such as a computer readable storage medium, which can comprise a plurality of files, each file with a physical location on said computer readable storage medium. The computer readable storage medium may be an optical disk which may be for example in the form of a Digital Versatile Disc ("digital video disc," "DVD"). The invention is not limited to this type of computer readable medium, however. Other exemplary forms of computer readable media are RAM, ROM, EEPROM, flash memory or other memory technology, CD-ROM, or other optical disk storage, magnetic cassettes, magnetic tape, magnetic disk storage or other magnetic and optical storage devices, or any other medium which can be used to store the desired information and which can accessed by a computer.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A method of setting up a group communication session at an access network within a wireless communications system, comprising:
   receiving, at the access network, a request to allocate a given data channel to a given wireless communication device;
   determining whether the given data channel is available for allocation to the given wireless communication device;
   if the given data channel is determined not to be available for allocation to the given wireless communication device, determining a priority score to be associated with the received request;
   initiating one of a plurality of data channel acquisition procedures if the determined priority score is above at least one priority score threshold, each of the plurality of data channel acquisition procedures configured to obtain the given data channel in order to service the received request.

2. The method of claim 1, wherein the given wireless communication device is an originator of the group communication session, and the access network corresponds to a serving access network of the originator.

3. The method of claim 2, wherein determining the priority score includes:
  acquiring one or more priority levels associated with the received request; and
  generating the priority score as a function of the one or more priority levels.

4. The method of claim 3,
  wherein the acquiring step acquires a single priority level, and wherein the generating step sets the priority score to the single priority level.

5. The method of claim 3,
  wherein the acquiring step acquires multiple priority levels,
  and wherein the generating step generates the priority score based on each of the multiple priority levels.

6. The method of claim 3, wherein the one or more priority levels include at least one of (i) a service-type priority level indicative of a requested priority level by the originator for the group communication session, (ii) a device-specific or user-specific priority level associated with the originator and/or (iii) a device-specific or user-specific priority level associated with one or more targets of the group communication session.

7. The method of claim 3, further comprising:
  sending a message that is configured to request that a remote access network serving at least one target wireless communication device of the group communication session selectively allocate a data channel to the at least one target wireless communication device based on the priority score.

8. The method of claim 7,
  wherein the sending step sends the message to a group communication server configured to arbitrate the group communication session,
  and wherein the group communication server is responsible for forwarding another message to the remote access network to request the remote access network to perform the selective allocation.

9. The method of claim 7, wherein the sending step sends the message directly to the remote access network.

10. The method of claim 1,
  wherein the given wireless communication device is a target of the group communication session,
  wherein the received request corresponds to a forwarded request from a serving access network of an originator of the group communication session or a group communication server that is configured to arbitrate the group communication session.

11. The method of claim 10,
  wherein the received request includes an indication of the priority score,
  and wherein determining the priority score obtaining the indication of the priority score from the received request.

12. The method of claim 1, wherein the determining whether the given data channel is available determines that the given data channel is not available based on a number of data channels that are currently available for allocation by the access network to wireless communication devices.

13. The method of claim 12, wherein the determining whether the given data channel is available determines that the given data channel is not available if the number of data channels that are currently available for allocation by the access network to wireless communication devices is less than or equal to a threshold number or threshold percentage of data channels.

14. The method of claim 13, wherein the threshold number is zero or the threshold percentage is zero percent.

15. The method of claim 1, further comprising:
  if the given data channel is determined to be available for allocation to the given wireless communication device, allocating the given data channel to the given wireless communication device.

16. The method of claim 1, wherein the plurality of data channel acquisition procedures include (i) a preemption procedure whereby the given data channel is re-allocated from another wireless communication device for allocation to the given wireless communication device, and (ii) a queuing procedure whereby the received request is queued until the given data channel becomes available for allocation to the given wireless communication device.

17. The method of claim 16, wherein the initiating step initiates the preemption procedure, further comprising:
  selecting one of a plurality of wireless communication devices that are each currently allocated a data channel;
  de-allocating the data channel from the selected wireless communication device; and
  allocating the de-allocated data channel to the given wireless communication device.

18. The method of claim 17, wherein the selecting step selects the selected wireless communication device based on relative priorities associated with the plurality of wireless communication devices.

19. The method of claim 17, further comprising:
  after the initiating step, waiting for an indication that at least one target wireless communication device has obtained its own data channel for use during the group communication session; and
  upon receiving the indication, performing the de-allocating and allocating steps.

20. The method of claim 16, wherein the initiating step initiates the queuing procedure, further comprising:
  adding the received request to a queue;
  determining, after the adding step, that the received request has a highest priority among queued requests within the queue and that the given data channel has become available for allocation to the given wireless communication device; and
  allocating the given data channel to the given wireless communication device.

21. The method of claim 16, wherein the preemption procedure and the queuing procedure are associated with different priority score thresholds.

22. The method of claim 16, further comprising:
  comparing the determined priority score with a set of priority scores and/or priority score ranges within a given table, at least one of the set of priority scores and/or priority score ranges associated with one of the plurality of data channel acquisition procedures; and
  selecting the data channel acquisition procedure to be initiated by the initiating step based on the comparison.

23. The method of claim 22, wherein at least one other of the set of priority scores and/or priority score ranges is associated with a decision to deny the received request for allocation of the given data channel to the given wireless communication device.

24. The method of claim 22, wherein the at least one of the set of priority scores and/or priority score ranges is associated with the queuing procedure.

25. The method of claim 22, further comprising:
  modifying one or more values of the set of priority scores and/or priority score ranges within the given table to change one or more triggering conditions for one or more of the data channel acquisition procedures.

26. The method of claim 1, further comprising:
denying the received request for allocation of the given data channel to the given wireless communication device if the determined priority score is not above the at least one priority score threshold.

27. The method of claim 1, wherein the given data channel requested for allocation by the received request includes one or more of (i) physical-layer resources and (ii) Internet-Protocol (IP)-layer resources.

28. The method of claim 27, wherein the physical-layer resources include a traffic channel (TCH).

29. The method of claim 27, wherein the IP-layer resources include one or more of (i) an IP address and/or (ii) a Quality-of-Service (QoS) resource reservation.

30. An access network configured to set-up a group communication session within a wireless communications system, comprising:
means for receiving a request to allocate a given data channel to a given wireless communication device;
means for determining whether the given data channel is available for allocation to the given wireless communication device;
means for, if the given data channel is determined not to be available for allocation to the given wireless communication device, determining a priority score to be associated with the received request;
means for initiating one of a plurality of data channel acquisition procedures if the determined priority score is above at least one priority score threshold, each of the plurality of data channel acquisition procedures configured to obtain the given data channel in order to service the received request.

31. The access network of claim 30, wherein the given wireless communication device is an originator of the group communication session, and the access network corresponds to a serving access network of the originator.

32. The access network of claim 30, wherein the given wireless communication device is a target of the group communication session, and the access network corresponds to a serving access network of the target.

33. An access network configured to set-up a group communication session within a wireless communications system, comprising:
logic configured to receive a request to allocate a given data channel to a given wireless communication device;
logic configured to determine whether the given data channel is available for allocation to the given wireless communication device;
logic configured to, if the given data channel is determined not to be available for allocation to the given wireless communication device, determine a priority score to be associated with the received request;
logic configured to initiate one of a plurality of data channel acquisition procedures if the determined priority score is above at least one priority score threshold, each of the plurality of data channel acquisition procedures configured to obtain the given data channel in order to service the received request.

34. The access network of claim 33, wherein the given wireless communication device is an originator of the group communication session, and the access network corresponds to a serving access network of the originator.

35. The access network of claim 33, wherein the given wireless communication device is a target of the group communication session, and the access network corresponds to a serving access network of the target.

36. A non-transitory computer-readable storage medium including instructions, which, when executed by an access network configured to set-up a group communication session within a wireless communications system, cause the access network to perform operations, the instructions comprising:
instructions to receive a request to allocate a given data channel to a given wireless communication device;
instructions to determine whether the given data channel is available for allocation to the given wireless communication device;
instructions to, if the given data channel is determined not to be available for allocation to the given wireless communication device, determine a priority score to be associated with the received request;
instructions to initiate one of a plurality of data channel acquisition procedures if the determined priority score is above at least one priority score threshold, each of the plurality of data channel acquisition procedures configured to obtain the given data channel in order to service the received request.

37. The non-transitory computer-readable storage medium of claim 36, wherein the given wireless communication device is an originator of the group communication session, and the access network corresponds to a serving access network of the originator.

38. The non-transitory computer-readable storage medium of claim 36, wherein the given wireless communication device is a target of the group communication session, and the access network corresponds to a serving access network of the target.

* * * * *